(12) United States Patent
Kawano et al.

(10) Patent No.: US 7,916,981 B2
(45) Date of Patent: Mar. 29, 2011

(54) OPTICAL MODULATOR

(75) Inventors: Kenji Kawano, Atsugi (JP); Masaya Nanami, Zama (JP); Yuji Sato, Atsugi (JP); Seiji Uchida, Atsugi (JP); Nobuhiro Igarashi, Sagamihara (JP); Toru Nakahira, Atsugi (JP); Hiroaki Senda, Isehara (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 12/063,789

(22) PCT Filed: Aug. 15, 2006

(86) PCT No.: PCT/JP2006/316044
§ 371 (c)(1),
(2), (4) Date: Feb. 14, 2008

(87) PCT Pub. No.: WO2007/020924
PCT Pub. Date: Feb. 22, 2007

(65) Prior Publication Data
US 2009/0034898 A1 Feb. 5, 2009

(30) Foreign Application Priority Data

Aug. 19, 2005 (JP) ................. 2005-238647
Sep. 2, 2005 (JP) ................. 2005-255004

(51) Int. Cl.
*G02F 1/01* (2006.01)
*G02F 1/035* (2006.01)
*G02B 6/12* (2006.01)
(52) U.S. Cl. ................. 385/1; 385/2; 385/3; 385/14
(58) Field of Classification Search .................. 385/1–3, 385/40
See application file for complete search history.

(56) References Cited

U.S. PATENT DOCUMENTS
4,709,978 A * 12/1987 Jackel .................. 385/3
(Continued)

FOREIGN PATENT DOCUMENTS
JP  A 8-86991  4/1996
(Continued)

OTHER PUBLICATIONS

"Optimal electrode design for integrated optics modulators," by Marcuse, IEEE Journal of Quantum Electronics, vol. 18, No. 3, Mar. 1982, pp. 393-398.*

(Continued)

Primary Examiner — Ryan Lepisto
Assistant Examiner — Robert Tavlykaev
(74) Attorney, Agent, or Firm — Greer, Burns & Crain, Ltd.

(57) ABSTRACT

An optical modulator, including: a substrate; an optical waveguide embedded in the substrate; a traveling wave electrode mounted on the substrate and having a traveling wave applied thereon so that a light wave is modulated by the traveling wave with an electro-optic effect. The traveling wave electrode includes a center electrode and ground electrodes; in which the optical waveguide has a plurality of interaction optical waveguides that form a Mach-Zehnder optical waveguide that modulates the light wave in a phase modulation manner when the traveling wave is applied to the traveling wave electrode, the interaction optical waveguides form a region where respective widths of the interaction optical waveguides are different from each other, and the center electrode and the ground electrodes are positioned such that interaction efficiencies between the high frequency electric signal and the light wave guided in the respective interaction optical waveguides are substantially equal to each other.

5 Claims, 20 Drawing Sheets

U.S. PATENT DOCUMENTS

| | | | |
|---|---|---|---|
| 6,052,496 | A | 4/2000 | O'Donnell |
| 2006/0120654 | A1 | 6/2006 | Aoki et al. |

FOREIGN PATENT DOCUMENTS

| | | |
|---|---|---|
| JP | A 11-505337 | 5/1999 |
| JP | 2005-107229 | 4/2005 |
| JP | A 2005-91698 | 4/2005 |
| JP | A 2005-107229 | 4/2005 |
| WO | 96/36901 | 11/1996 |

OTHER PUBLICATIONS

"Mode size and method of estimating the propagation constant of single-mode Ti:LiNbO3 strip waveguides," by Korotky et al, IEEE Journal of Quantum Electronics, vol. QE-18, No. 10, Oct. 1982, pp. 1796-1801.*

Jackel et al., "Nonsymmetric Mach-Zehnder Interferometers Used as Low-Drive-Voltage Modulators," Journal of Lightwave Technology, IEEE Service Center, New York, NY, vol. 6, No. 8, Aug. 1, 1988, pp. 1348-1351.

Nayyer et al., "Proposal of an Asymetric Mach-Zehnder Structure with Improved Optical Modulation Characteristics," Australian Conference on Optical Fibre Technology Proceedings, XX, XX, Jan. 1, 1994, pp. 166-169.

Courjal et al., "Modeling and Optimization of Low Chirp LiNbO$_3$ Mach-Zehnder Modulators With an Inverted Ferroelectric Domain Section," Journal of Lightwave Technology, vol. 22, No. 5, May 2004, pp. 1338-1343.

Jiang et al "LiNbO3 Mach-Zehnder Modulators with Fixed Negative Chirp," Photonics Technology Letters, vol. 8, No. 10, 1996, pp. 1319-1321.

* cited by examiner

US 7,916,981 B2

OPTICAL MODULATOR

TECHNICAL FIELD

The present invention relates to an optical modulator with high modulation velocity, low alpha parameter, high extinction ratio, low drive voltage, and low DC bias voltage.

BACKGROUND ART

Up until now, there has been developed an optical modulator such as a traveling wave electrode type of lithium niobate optical modulator (hereinafter simply referred to as an LN optical modulator) comprising a substrate (hereinafter simply referred to as an LN substrate) made of a material such as lithium niobate ($LiNbO_3$) having an electro-optic effect to cause a refractive index of an incident light to be varied in response to an electric field applied to the substrate, thereby making it possible to form an optical waveguide and a traveling wave electrode in and on the substrate. The LN optical modulator can be applied to a large volume optical transmission system having a capacity in the range of 2.5 Gbit/s to 10 Gbit/s due to the excellent chirping characteristics. In recent years, the LN optical modulator thus constructed is under review to be applied to the optical transmission system having a super large capacity of 40 Gbit/s and therefore expected as a key device in this technological field.

(First Prior Art)

There are two types of LN optical modulators with respect to the states of the substrate, one substrate having a z-cut state, and the other having an x-cut state (or a y-cut state). Here, x-cut LN substrate type LN optical modulator will be described as the first prior art, wherein the LN optical modulator comprises an x-cut LN substrate and a coplanar waveguide (CPW) forming a traveling wave electrode. FIG. 13 is a perspective view showing the x-cut substrate type LN optical modulator. FIG. 14 is a sectional view taken along the line A-A' of FIG. 13.

The conventional LN modulation device comprises an x-cut LN substrate 1, an $SiO_2$ buffer layer 2, and an optical waveguide 3 formed to be flush with an upper surface of the x-cut LN substrate 1 wherein the $SiO_2$ buffer layer 2 has a thickness of 200 nm to 1 μm and transparent to incident light having optical wavelength typically utilized for optical communications such as for example 1.3 μm and 1.55 μm. The optical waveguide 3 is formed with a process of evaporating a metal Ti (titanium) on the x-cut LN substrate 1 and a process of thermal diffusing at a temperature of 1050° C. for approximately 10 hours, the optical waveguide 3 forming a Mach-Zehnder interferometer (a Mach-Zehnder optical waveguide). The optical waveguide 3 includes two interaction optical waveguides, that is, two arms 3a and 3b at the position where an electric signal and an incident light are interacted with each other (the position will be referred to as an interaction portion). The conventional LN optical modulator further comprises a traveling wave electrode 4 having two ground electrodes 4b, 4c and a center electrode 4a placed between the two ground electrodes 4b, 4c.

As shown in FIG. 14, the interaction optical waveguides 3a and 3b have widths represented by $W_a$ and $W_b$, respectively. In this first prior art, the interaction optical waveguides 3a and 3b have same widths with each other, that is, $W_a=W_b$, where $W_a$ and $W_b$ both represent the same value exemplified by 9 μm. The legend $G_{wg}$ represents the distance between the interaction optical waveguides 3a and 3b (or a gap between the waveguides), the distance being set at, such as, 16 μm. The legend Δ represents a distance in the horizontal direction between one edge of the center electrode 4a and the center of the interaction optical waveguide 3b (that is, the center line), the edge of the center electrode 4a facing the ground electrode 4c. In general, the interaction optical waveguides 3a and 3b are symmetrically positioned with respect to the center electrode 4a and the ground electrodes 4b and 4c, which leads to the fact that the distance in the horizontal direction between another edge of the center electrode 4a facing the ground electrode 4b and the center of the interaction optical waveguide 3b is represented by Δ.

In FIG. 14, the center of the center electrode 4a in the width direction is represented by a center line 18. The centers of the interaction optical waveguides 3a and 3b in the width direction are represented by center lines 19a and 19b, respectively.

FIG. 15 is a top view showing the optical waveguide 3. The length of the interaction optical waveguides 3a and 3b is represented by the legend L. The position of the line A-A' in FIG. 15 corresponds to the position of the line A-A' in the perspective view shown in FIG. 13, though only the optical waveguide 3 is shown in FIG. 15.

In this first prior art, both a bias voltage (generally a DC bias voltage) and a high frequency electric signal (an RF electric signal) are superimposed and applied between the center electrode 4a and the ground electrodes 4b and 4c, thereby resulting in the fact that the incident light is phase modulated not only by the RF electric signal but also by the DC bias voltage at each of the interaction optical waveguides. The buffer layer 2 is important in that it functions to expand a modulation bandwidth of the optical modulator by reducing a microwave equivalent refractive index $n_m$ of the electric signal traveling through the traveling wave electrode 4 to be close to an effective refractive index $n_0$ of the incident lights traveling through the respective interaction optical waveguides 3a and 3b.

The operation of the LN optical modulator thus constructed will be described hereinafter. Firstly, the DC bias voltage and the RF electric signal are necessary to be applied between the center electrode 4a and the ground electrodes 4b and 4c to realize the operation of the LN optical modulator.

FIG. 16 is a graph showing the relationship between the applied voltage and the output light power of the LN optical modulator under a certain condition with the DC bias voltage set at "Vb". As shown in FIG. 16, the DC bias voltage "Vb" is generally set such that the output light power becomes middle value of the peak-to-peak value.

FIG. 17 is a graph showing the relationship between the distance Δ and the product of the half wavelength voltage Vπ and the length L (that is, Vπ·L, which is utilized as a barometer of the driving voltage), where the legend Δ represents the distance in the horizontal direction between one edge of the center electrode 4a and the center line 19b of the interaction optical waveguide 3b, and the legend L represents the length of the interaction optical waveguides. In this calculation, the value Δ is varied by changing the gap $G_{wg}$ representing the distance between the interaction optical waveguides 3a and 3b. As shown in FIG. 17, the distance Δ in the horizontal direction between one edge of the center electrode 4a and the center line 19b of the interaction optical waveguide 3b should be small to a certain extent, and there exists an optimum value.

When the value Δ, the distance in the horizontal direction between the edge of the center electrode 4a and the center line 19b (19a) of the interaction optical waveguide 3b (3a), is set to be smaller in order to lower the driving voltage, the gap $G_{wg}$, the distance between the interaction optical waveguides 3a and 3b, also becomes smaller. The optical modulator, however, encounters such a problem that the optical power ratio between the condition of the optical output is ON state and OFF state, that is, extinction ratio, is deteriorated under the condition that the gap $G_{wg}$ between the interaction optical waveguides 3a and 3b becomes smaller. This results from the fact that the degree of coupling between the interaction optical waveguides 3a and 3b becomes severely large.

(Second Prior Art)

There has been two methods to make the degree of coupling between the interaction optical waveguides 3a and 3b smaller, one being achieved by setting the gap $G_{wg}$ wider so that the incident lights in the interaction optical waveguides 3a and 3b are transmitted to be away from each other, the other being achieved by setting the widths of the interaction optical waveguides different from each other so that the incident lights respectively traveling the incident optical waveguides have the respective effective refractive indexes (propagation constants) different from each other.

However, the value Vπ·L becomes larger as the gap $G_{wg}$ between the interaction optical waveguides 3a and 3b becomes larger as shown in FIG. 17, which results in the fact that the driving voltage is required to be higher. To avoid this problem, the widths $W_a'$ and $W_b'$ of the interaction optical waveguides 5a and 5b are set to be different from each other according to the second prior art as shown in FIG. 19. FIG. 20 is a top view showing the optical waveguide 5 according to the second prior art. FIG. 19 is a sectional view taken along the line B-B' of FIG. 20, shown with the x-cut LN substrate 1, the center electrode 4a, the ground electrodes 4b and 4c, and the buffer layer 2.

The legend Δ' represents the distance in the horizontal direction between one edge of the center electrode 4a and the center line of the interaction optical waveguide 5b, the edge facing the ground electrode 4c. In FIG. 19, the centers of the interaction optical waveguides 5a and 5b in the width direction are represented by center lines 20a and 20b, respectively.

The second prior art as described above, however, encounters some problems. Firstly, each of the widths $W_a'$ and $W_b'$ of the interaction optical waveguides 5a and 5b is set to be partially varied as shown in FIG. 20. Here, the interaction optical waveguides 5a and 5b form a first region having a length of L1 and a second region having a length of L2.

As shown in FIG. 20, the interaction optical waveguides 5a and 5b have taper portions 6, 7, 8, 9, 10 and 11 to have the widths of the interaction optical waveguides varied, each of the interaction optical waveguides 5a and 5b being required to have three taper portions. It is well known that radiation loss is caused at the portion where the width of the optical waveguide is varied. Furthermore, the radiation loss at the taper portion where the optical waveguide is widened and the radiation loss at the taper portion where the optical waveguide is narrowed are different from each other. Therefore, the incident lights respectively traveling the interaction optical waveguides 5a and 5b have powers different from each other, which results in the deterioration of the extinction ratio.

The major problem, that is, the chirping problem encountered by the second prior art will be described hereinafter. The degree of chirping can be represented by an alpha parameter (i.e., "a" parameter) as described by the formula (1), wherein the alpha parameter is calculated by a phase "φ" of the optical signal pulse outputted from the optical modulator and an intensity (amplitude) "E" of the optical signal pulse (disclosed in non-patent document 1).

$$\alpha=[d\phi/dt]/[(1/E)(dE/dt)] \quad (1)$$

As can be seen in the above, the "α" parameter is calculated with an amount of phase shift and an amount of intensity variation of the optical signal pulse outputted from the optical modulator.

The "α" parameter can be represented by a formula (2), which is further developed from the formula (1).

$$\alpha=(\Gamma1-\Gamma2)/(\Gamma1+\Gamma2) \quad (2)$$

"Γ1": An interaction efficiency normalized by the numerical number 1 in the form of overlap integration between the amplitude of the electric signal and the power of the incident light passing through the interaction optical waveguide 5a.

"Γ2": An interaction efficiency normalized by the numerical number 1 in the form of overlap integration between the amplitude of the electric signal and the power of the incident light passing through the interaction optical waveguide 5b. The value "Γ1" for the interaction optical waveguide 5a at the first region becomes equal to the value "Γ2" for the interaction optical waveguide 5b at the second region while the value "Γ2" for the interaction optical waveguide 5b at the first region becomes equal to the value "Γ1" for the interaction optical waveguide 5a at the second region, under the condition that the width $W_a'$ of the interaction optical waveguide 5a at the first region having a length of L1 is set to be equal to the width $W_b'$ of the interaction optical waveguide 5b at the second region having a length of L2 while the width $W_b'$ of the interaction optical waveguide 5b at the first region is set to be equal to the width $W_a'$ of the interaction optical waveguide 5a at the second region. However, this does not mean that the chirping becomes zero, that is, α=0, by setting the length L1 of the first region equal to the length L2 of the second region.

This stems from the fact that the traveling wave electrode 4 constituted by the center electrode 4a and ground electrodes 4b, 4c not shown in FIG. 20 causes high propagation loss to the high frequency electric signal traveling therethrough, which results in the high frequency electric signal attenuated as the high frequency electric signal propagates the traveling wave electrode 4. In order to make the alpha parameter "α" in the formula (2) to be zero, it is required to fulfill the following condition due to the attenuation of the high frequency electric signal.

$$L1<L2 \quad (3)$$

The condition to be imposed on the length L1 of the first region and the length L2 of the second region shown in FIG. 20 to make the chirping zero, that is, α=0 will be described hereinafter in detail. The microwave propagation loss at the frequency "f" under the condition that the high frequency electric signal is imposed on the traveling wave electrode 4 formed by the center electrode 4a and ground electrodes 4b, 4c is represented by $\beta_m(f)$. The integration values calculated by the interaction efficiency between the incident lights in the respective interaction optical waveguides 5a, 5b and the electric signal integrated by the length at the first region with the length of L1 and the second region with the length of L2 are represented by $I_1(f)$ and $I_2(f)$, respectively (the integration value simply be referred to as a modulation efficiency).

Each of the modulation efficiency $I_1(f)$ and $I_2(f)$ depends on the frequency "f" and can be described as the formulas (4) and (5) where the incident light and the electric signal propagate in the "z" direction.

$$I_1(f) = \int_0^{L1} \exp(-\beta_m(f) \cdot z) dz \quad (4)$$
$$= (1 - \exp(-\beta_m(f) \cdot L_1))/\beta_m(f)$$

-continued $$I_2(f) = \int_{L1}^{L2} \exp(-\beta_m(f) \cdot z) dz \qquad (5)$$
$$= \exp(-\beta_m(f) \cdot L_1) \cdot (1 - \exp(-\beta_m(f) \cdot L_2))/\beta_m(f)$$

The chirping can be zero at any frequency "f" by setting the length L1 of the first region and the length L2 of the second region in such a way that the modulation efficiencies $I_1(f)$ and $I_2(f)$ fulfill the following condition.

$$I_1(f) = I_2(f) \qquad (6)$$

In other words, the alpha parameter becomes zero when the condition of the formula (6) is fulfilled.

According to the above described calculation, there is a relationship between the length L1 of the first region and the length L2 of the second region as follows.

$$L1/L2 \approx 0.9 \qquad (7)$$

However, manufacturing variations generally occurs typically in the width and the thickness of the center electrode 4a, the shape of the trapezoid and the inverted trapezoid, and the gaps between the center electrode 4a and ground electrodes 4b and 4c, due to the fact that the traveling wave electrode 4 is formed with a thick gold plating having a thickness of 20 µm or more. This results in the fact that the microwave propagation loss $\beta_m(f)$ at the frequency "f" of the high frequency electric signal propagating the traveling wave electrode 4 varies within the z-cut LN substrate not shown in FIG. 20, and varies from run-to-run of the manufacturing. Therefore, the process yield achieving the condition of α=0 can not be expected.

(Non-patent Document 1)

Nadege Courjal et al "Modeling and Optimization of Low Chirp LiNbO₃ Mach-Zehnder Modulators With an Inverted Ferroelectric Domain Section "Journal of Lightwave Technology vol. 22 No. 5 May 2004

DISCLOSURE OF THE INVENTION

Problems to be Solved by the Invention

As described above, the distance between two interaction optical waveguides becomes short when the interaction optical waveguides are positioned to be close to the center electrode in order to reduce the driving voltage, which results in the deterioration in the extinction ratio, the pulse shape, and the high frequency modulation characteristics such as a chirping, due to the coupling between the incident lights according to the first prior art. The process yield is worsened and the extinction ratio is deteriorated to achieve the condition of chirping-zero under the condition that the widths of the interaction optical waveguides are set to be different from each other due to the propagation loss of the high frequency electric signal according to the second prior art.

Means for Solving the Problems

It is, therefore, an object of the present invention to provide an optical modulator to solve the problems in accordance with the prior arts as described above. According to a first aspect of the present invention, there is provided an optical modulator, comprising: a substrate having an electro-optic effect; an optical waveguide embedded in the substrate to have a light wave guided therein; and a traveling wave electrode mounted on the substrate to have a high frequency electric signal applied thereon so that the light wave is modulated by the high frequency electric signal with the electro-optic effect, the traveling wave electrode being constituted by a center electrode and ground electrodes; in which the optical waveguide has a plurality of interaction optical waveguides to collectively form a Mach-Zehnder optical waveguide operative to modulate the light wave in a phase modulation manner under the condition that the high frequency electric signal is applied to the traveling wave electrode, the interaction optical waveguides collectively form a region where respective widths of the interaction optical waveguides are different from each other, and the center electrode and the ground electrodes are positioned such that interaction efficiencies between the high frequency electric signal and the light wave guided in the respective interaction optical waveguides are substantially equal to each other.

According to a second aspect of the present invention, there is provided an optical modulator as set forth in claim 1, in which the interaction optical waveguides are formed such that magnitude relationship between the widths of the interaction optical waveguides is unchanged.

According to a third aspect of the present invention, there is provided an optical modulator as set forth in claim 1, in which the interaction optical waveguides form additional region such that magnitude relationship between the widths of the interaction optical waveguides at the region and the additional region is reciprocal.

According to a fourth aspect of the present invention, there is provided an optical modulator as set forth in claim 3, in which the two regions have longitudinal lengths equal to each other, where the widths of the interaction optical waveguides at each of the two regions are different from each other.

According to a fifth aspect of the present invention, there is provided an optical modulator as set forth in claims 1 to 4, in which center of the center electrode is away from centers of the interaction optical waveguides with respective distances different from each other.

According to a sixth aspect of the present invention, there is provided an optical modulator as set forth in claims 1 to 4, in which the interaction optical waveguides collectively form a gap, and center of the gap is positioned away from center of the center electrode in a direction parallel to the surface of the substrate. According to a seventh aspect of the present invention, there is provided an optical modulator as set forth in claims 1 to 6, in which the center electrode and the ground electrodes each form gaps, the gaps having respective sizes different from each other.

Advantageous Effect of the Invention

The optical modulators according to the first to third, fifth, and sixth aspects of the present invention make it possible to improve the extinction ratio by setting the widths of the interaction optical waveguides constituting the Mach-Zehnder optical waveguide different from each other, due to the fact that the optical coupling between the two interaction optical waveguides is suppressed. Furthermore, it is possible to make the chirping to be zero by optimally setting the positions of the center electrode and ground electrodes so that the interaction efficiencies between the high frequency electric signals and the incident lights in the respective interaction optical waveguides become equal with each other.

The optical modulator according to the fourth aspect of the present invention makes it possible to suppress filter characteristics against the optical wavelength due to the fact that the optical path lengths of the interaction optical waveguides forming the Mach-Zehnder interferometer are equal with each other.

The optical modulator according to the seventh aspect of the present invention makes it possible to effectively equalize the interaction efficiencies between the high frequency electric signal and respective incident lights in the interaction optical waveguides by setting the gaps between the center electrode and the ground electrodes different from each other, due to the fact that the electric field intensity between the center electrode and the ground electrode becomes larger as the gap between the center electrode and the ground electrode becomes narrower.

The optical modulator according to the seventh aspect of the present invention can additionally prevent any other high frequency modulation characteristics from being deteriorated caused by the above mentioned optical coupling. This comes from the fact that the optical coupling is suppressed even when the gap between the two interaction optical waveguides is small.

DESCRIPTION OF THE REFERENCE NUMERALS

Figure 1:
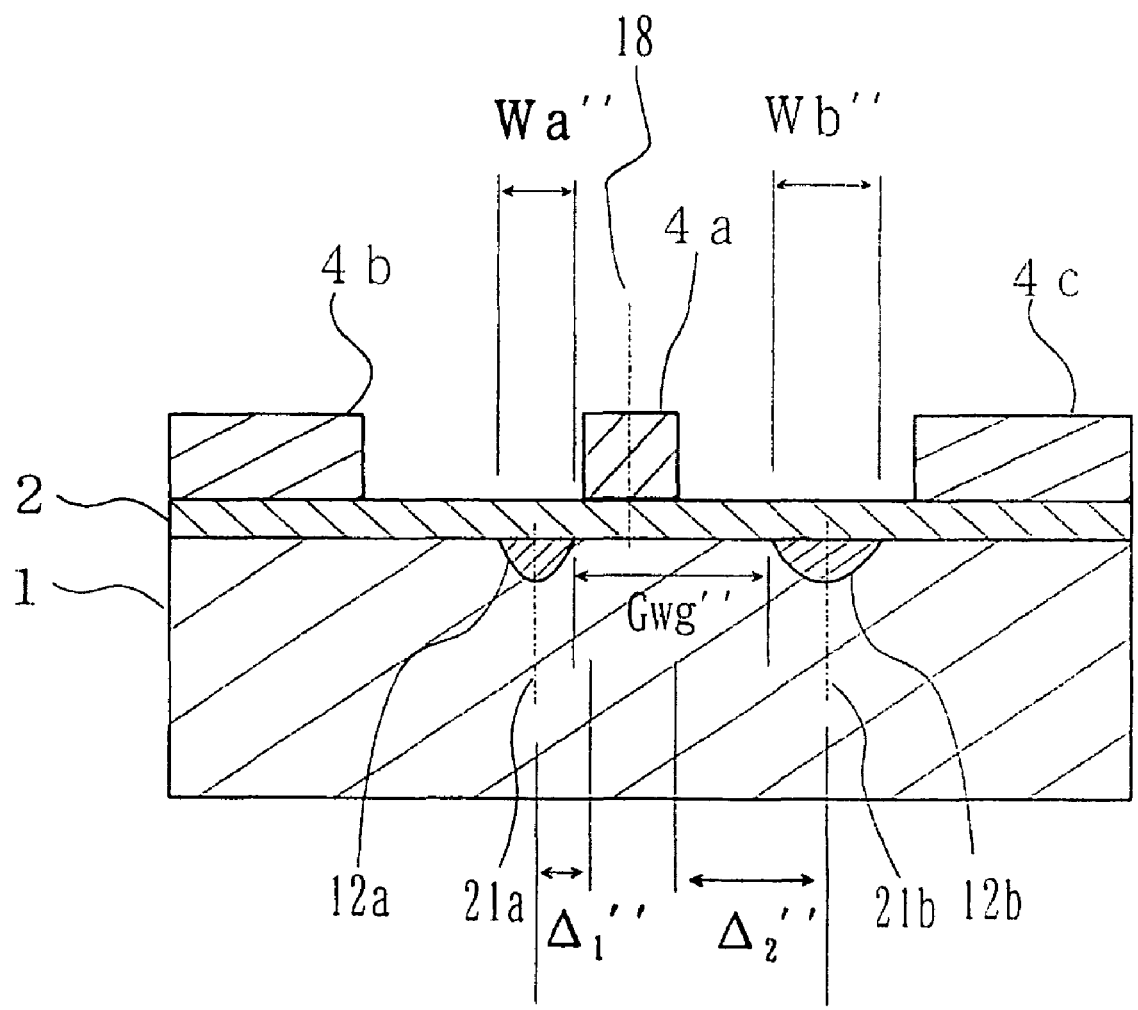
FIG. 1 is a sectional view taken along the line C-C' of FIG. 2 showing the optical modulator according to the first embodiment of the present invention.

1: x-cut LN substrate (substrate)
2: $SiO_2$ buffer layer (buffer layer)
3, 5, 12, 23: optical waveguide
3a, 3b, 5a, 5b, 12a, 12b, 23a, 23b: interaction optical waveguide
4, 17, 24: traveling wave electrode (CPW traveling wave electrode)
4a, 17a, 24a, 27a: center electrode
4b, 4c, 17b, 17c, 24b, 24c, 27b, 27c: ground electrode
6, 7, 8, 9, 10, 11, 13, 14, 15, 16: taper portion
18, 22, 26, 28: center of the center electrode (center line)
19a, 19b, 20a, 20b, 21a, 21b, 25a, 25b: center line of the interaction optical waveguide (center line, center)

DESCRIPTION OF THE PREFERRED EMBODIMENTS

The embodiments of the optical modulator according to the present invention will now be described in detail. The constitutional elements of the embodiments the same as those of the prior art shown in FIGS. 13 to 20 will not be described but bear the same reference numerals and legends as those of the prior art.

First Embodiment

Figure 2:
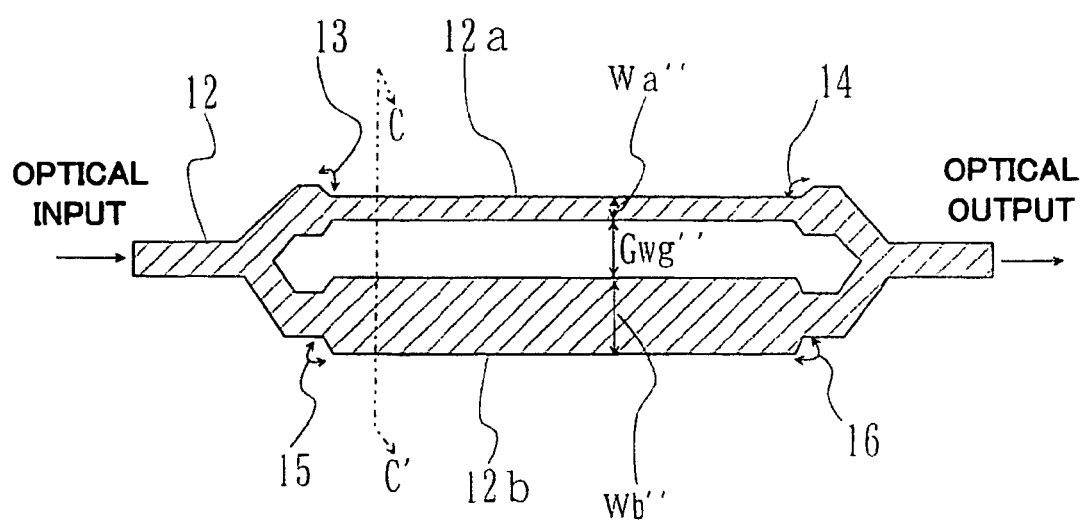
FIG. 2 is a top view showing the optical waveguide according to the first embodiment of the present invention.

FIG. 1 is a sectional view showing the optical modulator according to the first embodiment of the present invention. FIG. 2 is a top view showing the optical waveguide 12. The optical waveguide 12 is constituted by interaction optical waveguides 12a and 12b. The legend $W_a$" represents a width of the interaction optical waveguide 12a while the legend $W_b$" represents a width of the interaction optical waveguide 12b. The legend $G_{wg}$" represents a distance (a gap) between the edges of the interaction optical waveguides 12a and 12b, the edges facing each other. Here, FIG. 1 is a sectional view taken along the line C-C' of FIG. 2, shown with the center electrode 4a, the ground electrodes 4b and 4c, the x-cut LN substrate 1, and the $SiO_2$ buffer layer 2. Centers (center lines) 21a and 21b of the interaction optical waveguides 12a and 12b in the width direction are also shown in FIG. 1.

The legend $\Delta_1$" represents the distance in the horizontal direction between one edge of the center electrode 4a and the center 21a of the interaction optical waveguide 12a. The legend $\Delta_2$" represents the distance in the horizontal direction between the other edge of the center electrode 4a and the center 21b of the interaction optical waveguide 12b.

As shown in FIG. 2, the interaction optical waveguides 12a and 12b include taper portions 13, 14, 15 and 16 to have the widths of the interaction optical waveguides varied, each of the interaction optical waveguides 12a and 12b having two taper portions. In this embodiment, the optical modulator has an advantage of improved extinction ratio due to the fact that the total number of taper portions is less than the optical modulator according to the second prior art, and the number of taper portions to widen the interaction optical waveguides 12a, 12b and the number of taper portions to narrow the interaction optical waveguides 12a, 12b are equal to each other.

Figure 3:
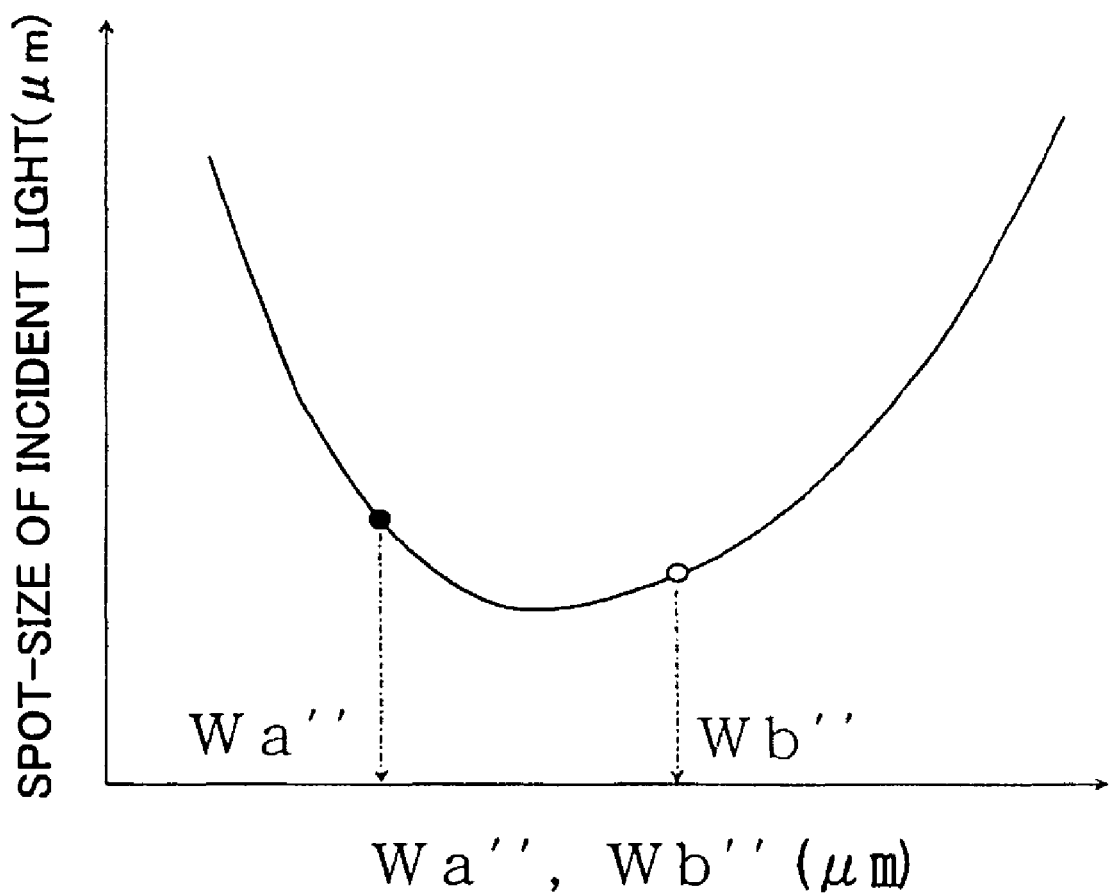
FIG. 3 is a graph showing the relationship between the width of the optical waveguide and the spot-size of the incident light.

The chirping characteristic, which is the most important characteristic of the optical modulator, will now be described hereinafter. FIG. 3 is a graph showing the spot-sizes of the incident lights traveling the interaction optical waveguides 12a and 12b with respect to the widths $W_a"$, $W_b"$ of the interaction optical waveguides 12a and 12b. As shown in FIG. 3, the incident light traveling the interaction optical waveguide 12a has a spot-size larger than that of the incident light traveling the interaction optical waveguide 12b, resulting from the fact that the interaction optical waveguide 12a has a remarkably narrow width of, for example, 6 μm compared to the width (for example 11 μm) of the interaction optical waveguide 12b according to the first embodiment.

Though there has been described that the widths $W_a"$ and $W_b"$ of the interaction optical waveguides 12a and 12b are respectively set at 6 μm and 11 μm, these widths are only examples, and it goes without saying that each of the widths can be set at any size in the range of approximately 3 μm to 15 μm in this invention.

The fact that the spot-size of the incident light traveling the interaction optical waveguide 12a is larger than that of the incident light traveling the interaction optical waveguide 12b leads to the fact that the normalized interaction efficiency $\Gamma 1"$ in the form of overlap integration between the electric signal (amplitude) and the incident light (power) passing through the interaction optical waveguide 12a is smaller than the normalized interaction efficiency $\Gamma 2"$ in the form of overlap integration between the electric signal (amplitude) and the incident light (power) passing through the interaction optical waveguide 12b.

Figure 4:
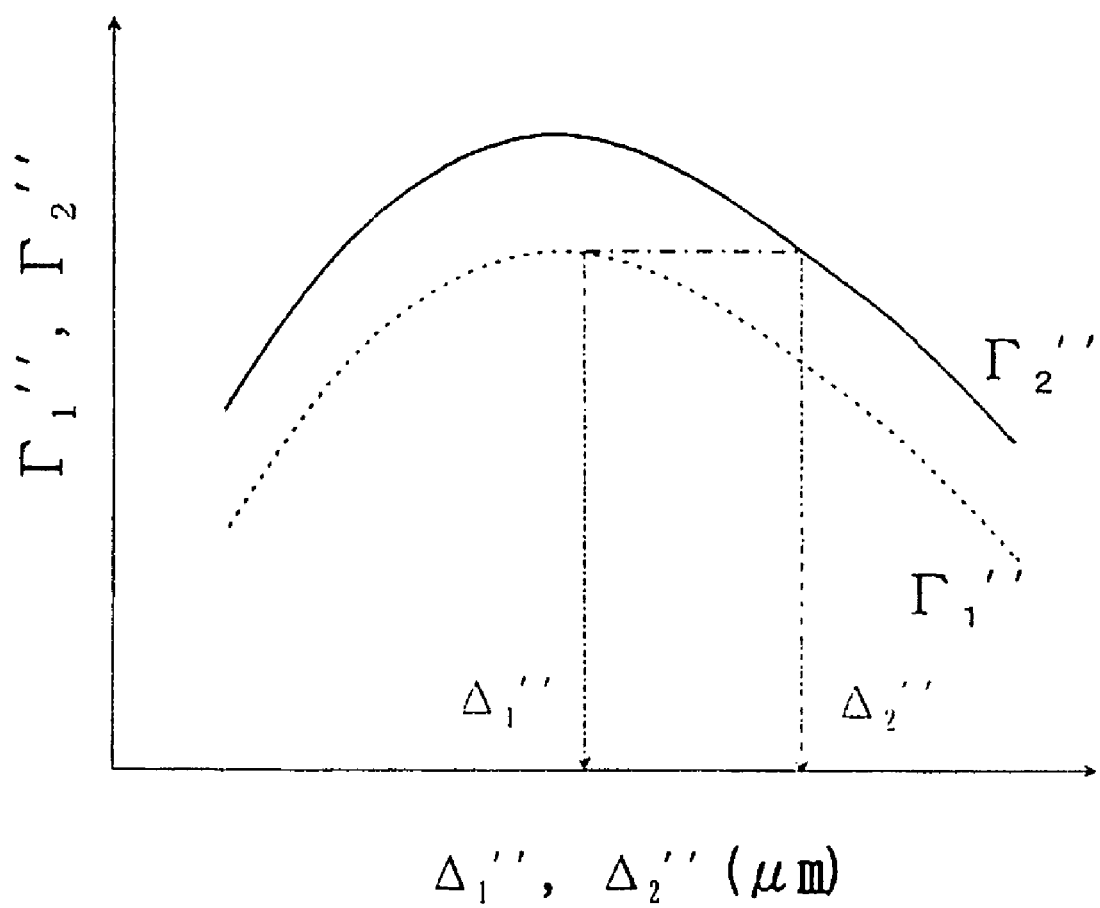
FIG. 4 is a graph showing the relationship between the modulation efficiency and the distance between the center electrode and the optical waveguide.
Figure 5:
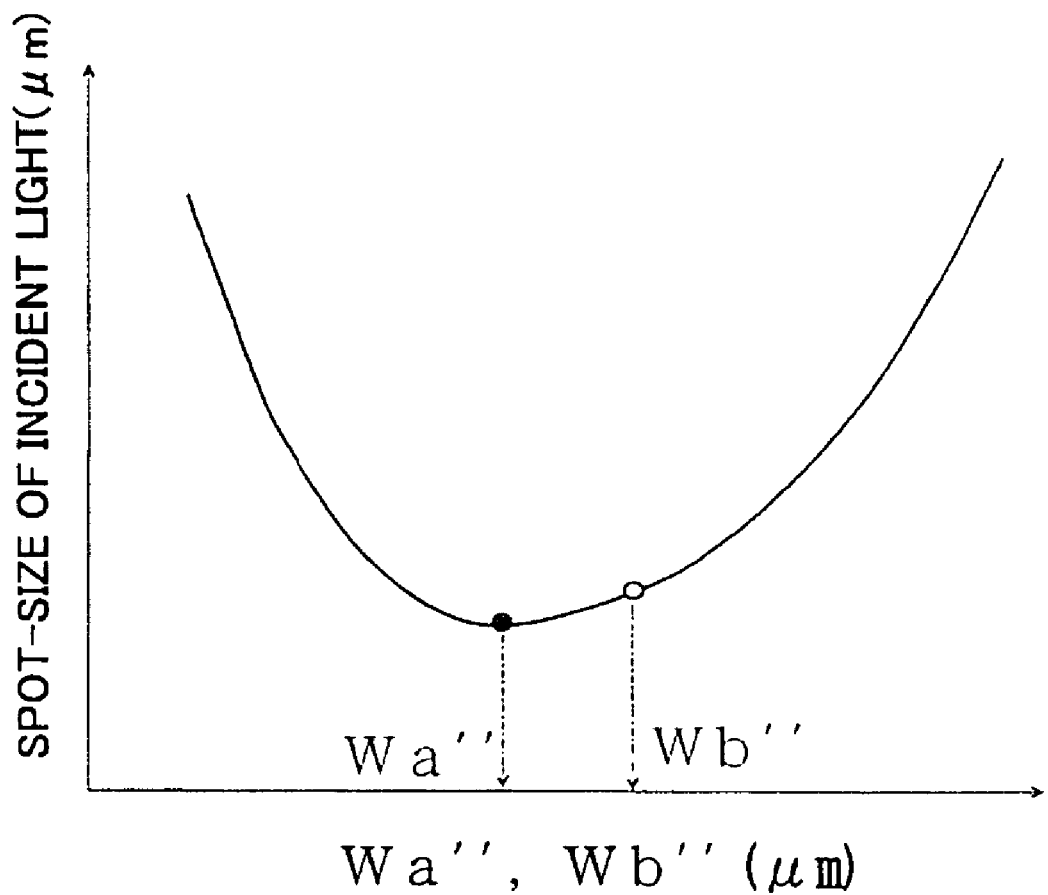
FIG. 5 is a graph showing the relationship between the width of the optical waveguide and the spot-size of the incident light.

This means that the interaction efficiency $\Gamma 1"$ of the interaction optical waveguide 12a and the interaction efficiency $\Gamma 2"$ of the interaction optical waveguide 12b with respect to the distance $\Delta_1"$ between one edge of the center electrode 4a and the center 21a of the interaction optical waveguide 12a and with respect to the distance $\Delta 2"$ between another edge of the center electrode 4a and the center 21b of the interaction optical waveguide 12b have a relationship that the interaction efficiency $\Gamma 1"$ is smaller than the interaction efficiency $\Gamma 2"$ within the whole range, as shown in FIG. 4.

In this invention, the chirping zero, that is, $\alpha=0$ is achieved by adjusting the distance $\Delta_1"$ between one edge of the center electrode 4a and the center 21a of the interaction optical waveguide 12a and the distance $\Delta_2"$ between another edge of the center electrode 4a and the center 21b of the interaction optical waveguide 12b to ensure that the interaction efficiency $\Gamma 1"$ of the interaction optical waveguide 12a and the interaction efficiency $\Gamma 2"$ of the interaction optical waveguide 12b become equal with each other. Here, the center line 18 of the center electrode 4a is positioned at the middle of the edges.

This results in the fact that the distance between one edge of the center electrode 4a and the center 21a of the interaction optical waveguide 12a is shorter than the distance between another edge of the center electrode 4a and the center 21b of the interaction optical waveguide 12b ($\Delta_1"<\Delta_2"$).

The chirping zero ($\alpha=0$) is, therefore, achieved by setting the widths of the interaction optical waveguides 12a and 12b different from each other to ensure that the optical coupling between the interaction optical waveguides 12a and 12b is suppressed while setting the positional relationship to be asymmetric against the center electrode 4a and ground electrodes 4b, 4c.

The fact that the distance $\Delta_1"$ between one edge of the center electrode 4a and the center 21a of the interaction optical waveguide 12a and the distance $\Delta_2"$ between another edge of the center electrode 4a and the center 21b of the interaction optical waveguide 12b have a relationship of $\Delta_1"\neq\Delta_2"$, as above mentioned, can be translated to the fact that the middle point of the center 21a and the center 21b is positioned away from the center 18 of the center electrode 4a. In this case, the middle point of the gap, the gap being defined by the interaction optical waveguides 12a and 12b, may be positioned away from the center 18 of the center electrode 4a, or may be overlapped with the center 18 of the center electrode 4a.

The spot-size of the incident light in the direction parallel to the surface of the substrate is considered to be designed in the above description to simplify the explanation. However, the designing with higher accuracy can be achieved when the spot-size of the incident light in the direction perpendicular to the surface of the substrate is considered to be designed. Here, the spot-size in the direction perpendicular to the surface of the substrate becomes larger as the widths of the interaction optical waveguides 12a and 12b become narrower.

It has been described about the magnitude relationship between the distance $\Delta_1"$ from one edge of the center electrode 4a to the center 21a of the interaction optical waveguide 12a and the distance $\Delta_2"$ from another edge of the center electrode 4a to the center 21b of the interaction optical waveguide 12b. Here, the magnitude relationship between $\Delta_1"$ and $\Delta_2"$ is the same as the magnitude relationship between the distance from the center 18 of the center electrode 4a to the center 21a of the interaction optical waveguide 12a and the distance from the center 18 of the center electrode 4a to the center 21b of the interaction optical waveguide 12b. The chirping can be suppressed more by setting the lengths of the taper portions 13, 14, 15 and 16 as short as possible unless optical loss is caused. These constitutions can be applied to all embodiments of the present invention.

The optical modulator according to the embodiments of the present invention can realize the zero chirping with high process yield resulting from the fact that the degree of chirping is independent of the factors relating to the lengths, which is different from the second prior art. Therefore, the chirping characteristic can be suppressed independently of the variation of the propagation loss of the high frequency electric signal.

Second Embodiment

As shown in FIG. 3, the spot-size of the interaction optical waveguide 12a is larger than that of the interaction optical waveguide 12b due to the fact that the width of the interaction optical waveguide 12a is set to be tremendously narrow. This results in the interaction efficiency $\Gamma 1"$ of the interaction optical waveguide 12a smaller than the interaction efficiency $\Gamma 2"$ of the interaction optical waveguide 12b according to the first embodiment of the present invention.

In the second embodiment of the present invention, the width of the interaction optical waveguide 12a is set at, for example, 7 μm to ensure that the spot-size of the incident light in the interaction optical waveguide 12a becomes smaller than the spot-size of the incident light in the interaction optical waveguide 12b.

Figure 6:
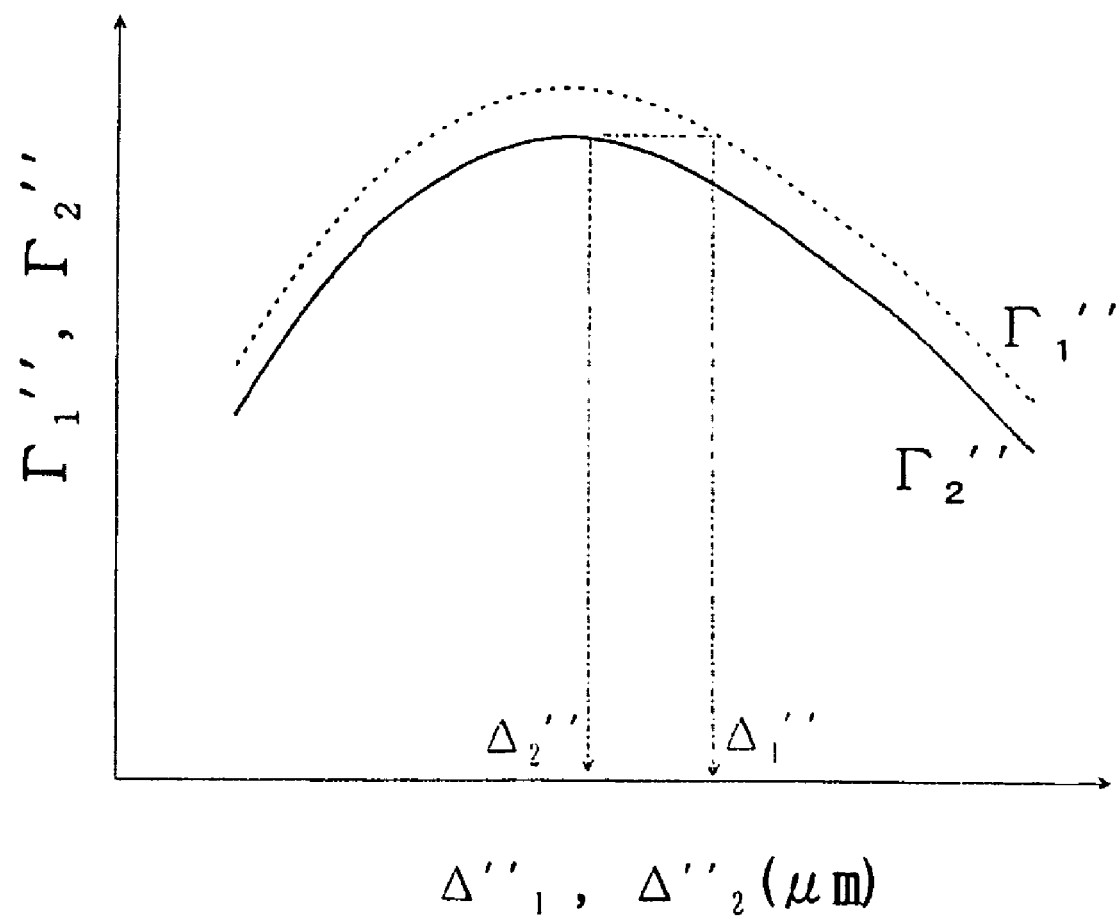
FIG. 6 is a graph showing the relationship between the modulation efficiency and the distance between the center electrode and the optical waveguide.

In this case, the interaction efficiency $\Gamma 1"$ of the interaction optical waveguide 12a and the interaction efficiency $\Gamma 2"$ of the interaction optical waveguide 12b with respect to the distance $\Delta_1"$ between one edge of the center electrode 4a and the center 21a of the interaction optical waveguide 12a and with respect to the distance $\Delta_2"$ between another edge of the center electrode 4a and the center 21b of the interaction optical waveguide 12b have a relationship that the interaction efficiency $\Gamma 1"$ is larger than the interaction efficiency $\Gamma 2"$ within the whole range, as shown in FIG. 6.

The relationship Γ1"=Γ2", that is, chirping zero can be achieved in this second embodiment by setting the distance $\Delta_2"$ between another edge of the center electrode 4a and the center 21b of the interaction optical waveguide 12b shorter than the distance $\Delta_1"$ between one edge of the center electrode 4a and the center 21a of the interaction optical waveguide 12a.

The optical modulator according to the embodiments of this invention has such a characteristic that the interaction optical waveguides 12a and 12b have positional relationship to be asymmetric against the center electrode 4a and ground electrodes 4b, 4c. Therefore, the distance $\Delta_1"$ between one edge of the center electrode 4a and the center 21a of the interaction optical waveguide 12a and the distance $\Delta_2"$ between another edge of the center electrode 4a and the center 21b of the interaction optical waveguide 12b have a relationship of $\Delta_1" \neq \Delta_2"$, as described in the first embodiment.

In this case, the middle point of the gap defined by the interaction optical waveguides 12a, 12b may be positioned away from the center 18 of the center electrode 4a, or may be overlapped with the center 18 of the center electrode 4a.

The optical modulator may be formed to be $\Delta_1"=\Delta_2"$ under a certain condition of the widths of the interaction optical waveguides 12a and 12b or a certain condition of these constructions, while the center of the gap between the interaction optical waveguides is positioned away from the center 18 of the center electrode 4a, which makes it possible to have the interaction efficiencies between the high frequency electric signal and the incident lights at the two interaction optical waveguides 12a and 12b equal to each other. These constitutions can be applied not only to the first and the second embodiments but also to all embodiments of the present invention.

Third Embodiment

Figure 7:
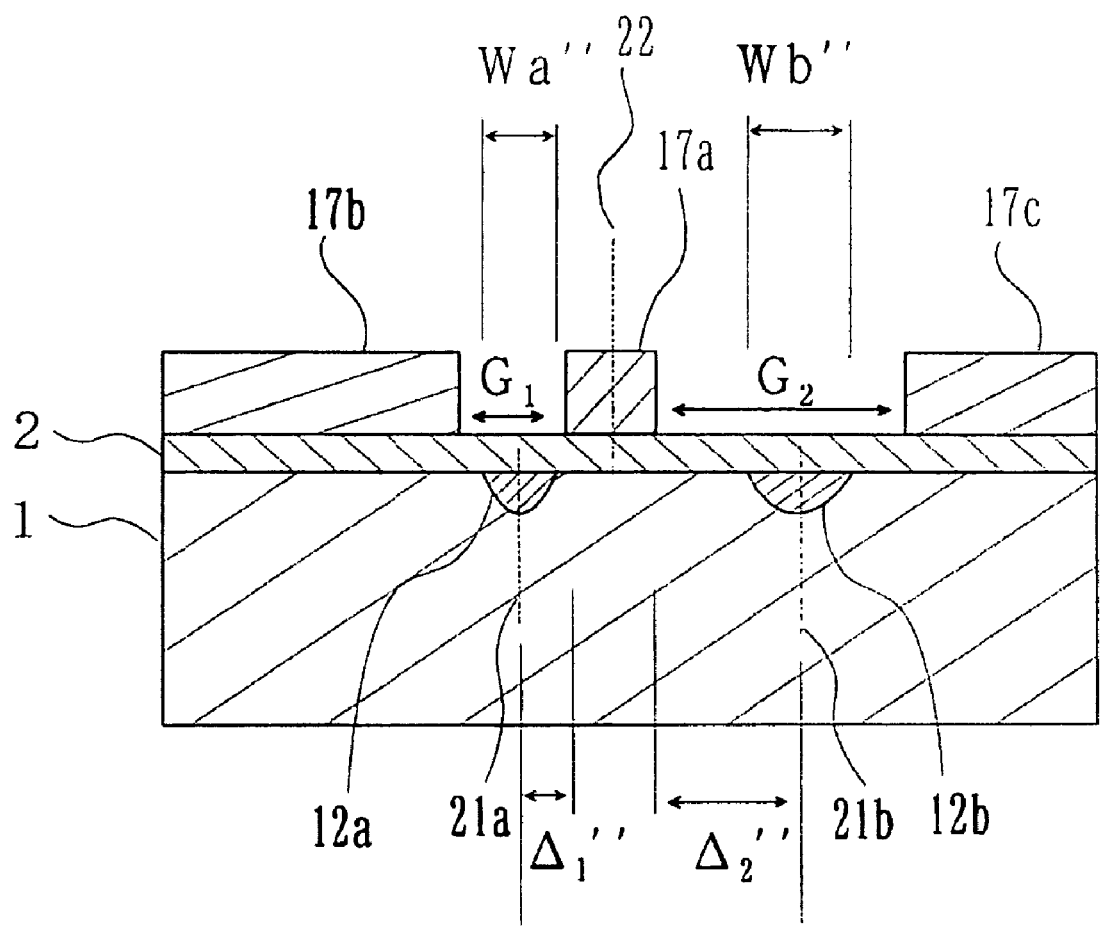
FIG. 7 is a sectional view showing the optical modulator according to the third embodiment of the present invention.

FIG. 7 is a sectional view showing the optical modulator according to the third embodiment of the present invention. In this embodiment, the constitution is developed compared to the constitution of the first embodiment shown in FIGS. 1 to 4 by utilizing the fact that the electric field intensity between the center electrode 17a and the ground electrodes 17b, 17c of the CPW traveling wave electrode 17 becomes stronger as the gap between the center electrode and the ground electrodes becomes narrower.

Here, the center (or the center line) 22 of the center electrode 17a in the width direction is shown in FIG. 7.

In this embodiment, the relationship Γ1"=Γ2", that is, the chirping zero is effectively achieved by setting the gaps G1 and G2 between the center electrode 17a and the respective ground electrodes 17b, 17c of the CPW traveling wave electrode to be different from each other (G1≠G2), while the interaction optical waveguides 12a and 12b are positioned to be asymmetrical with the center electrode 17a of the CPW traveling wave electrode 17 (the center 22 of the center electrode 17a is positioned away from the center of the interaction optical waveguides 12a, 12b) (G1<G2 in this FIG. 7).

Here, it is possible that the interaction optical waveguides 12a and 12b are positioned symmetrically with the center electrode 17a of the CPW traveling wave electrode 17 ($\Delta_1"=\Delta_2"$, or the center electrode may be positioned at the center of the gap between the two interaction optical waveguides 12a and 12b) as long as the relationship Γ1"=Γ2" can be maintained by setting the gap to be G1≠G2. The constitution to set the gaps to be G1≠G2 can be applied to any embodiments of this invention including the first and the second embodiments.

Fourth Embodiment

Figure 8:
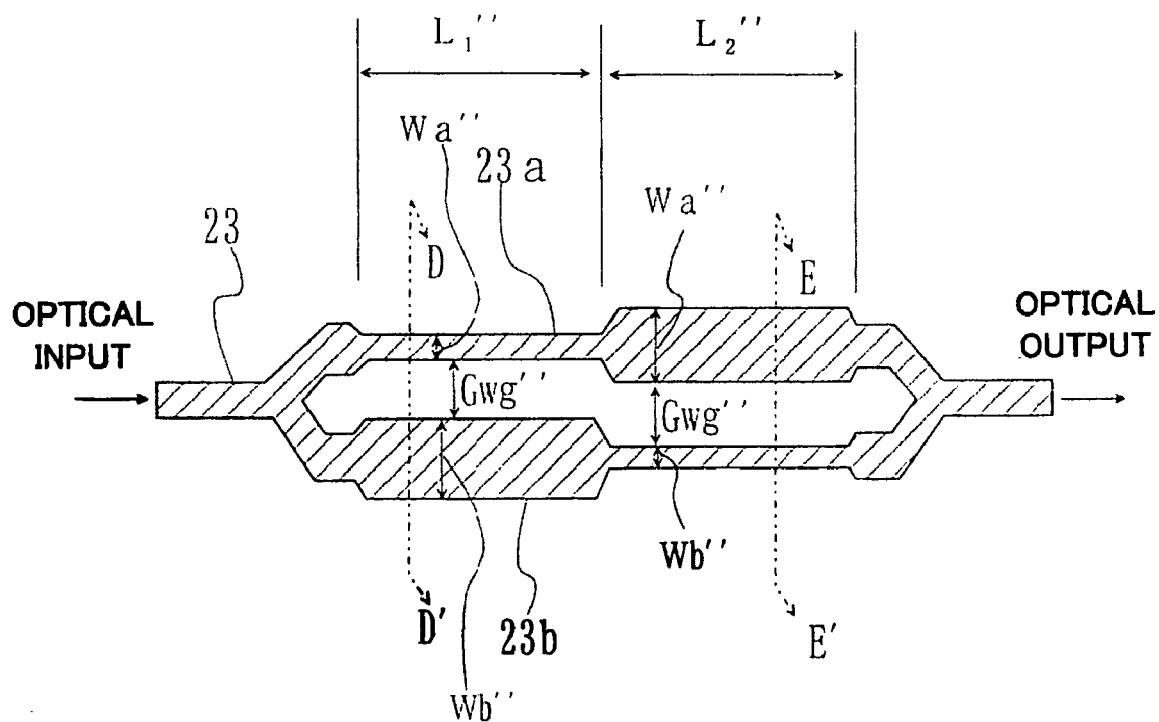
FIG. 8 is a top view showing the optical waveguide according to the fourth embodiment of the present invention.

FIG. 8 is a top view showing the optical waveguide 23 of the optical modulator according to the fourth embodiment of the present invention. The optical waveguide 23 is constituted by interaction optical waveguides 23a and 23b. The legend $W_a"$ represents a width of the interaction optical waveguide 23a while the legend $W_b"$ represents a width of the interaction optical waveguide 23b. The widths $W_a"$ and $W_b"$ are set to be different from each other to ensure that the optical coupling between the interaction optical waveguides 23a and 23b are suppressed. The legend $G_{wg}"$ represents a distance (a gap) between the edges of the interaction optical waveguides 23a and 23b.

As shown in FIG. 8, the magnitude relationship between the widths $W_a"$ and $W_b"$ of the interaction optical waveguides 23a and 23b at a first region having a length of L1" is reciprocal to the magnitude relationship between the widths Wa" and Wb" of the interaction optical waveguides 23a and 23b at a second region having a length of L2".

Figure 9:
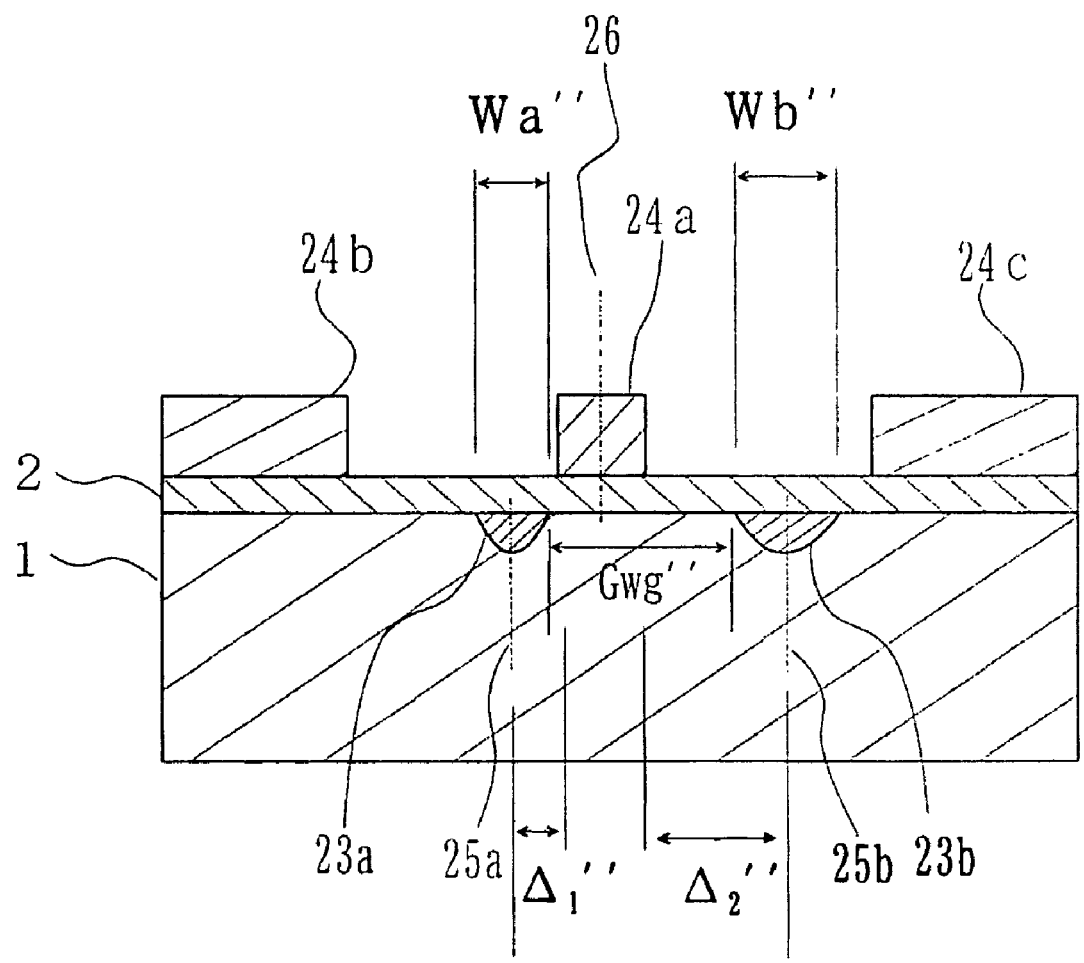
FIG. 9 is a sectional view taken along the line D-D' of FIG. 8 showing the optical modulator according to the fourth embodiment of the present invention.
Figure 10:
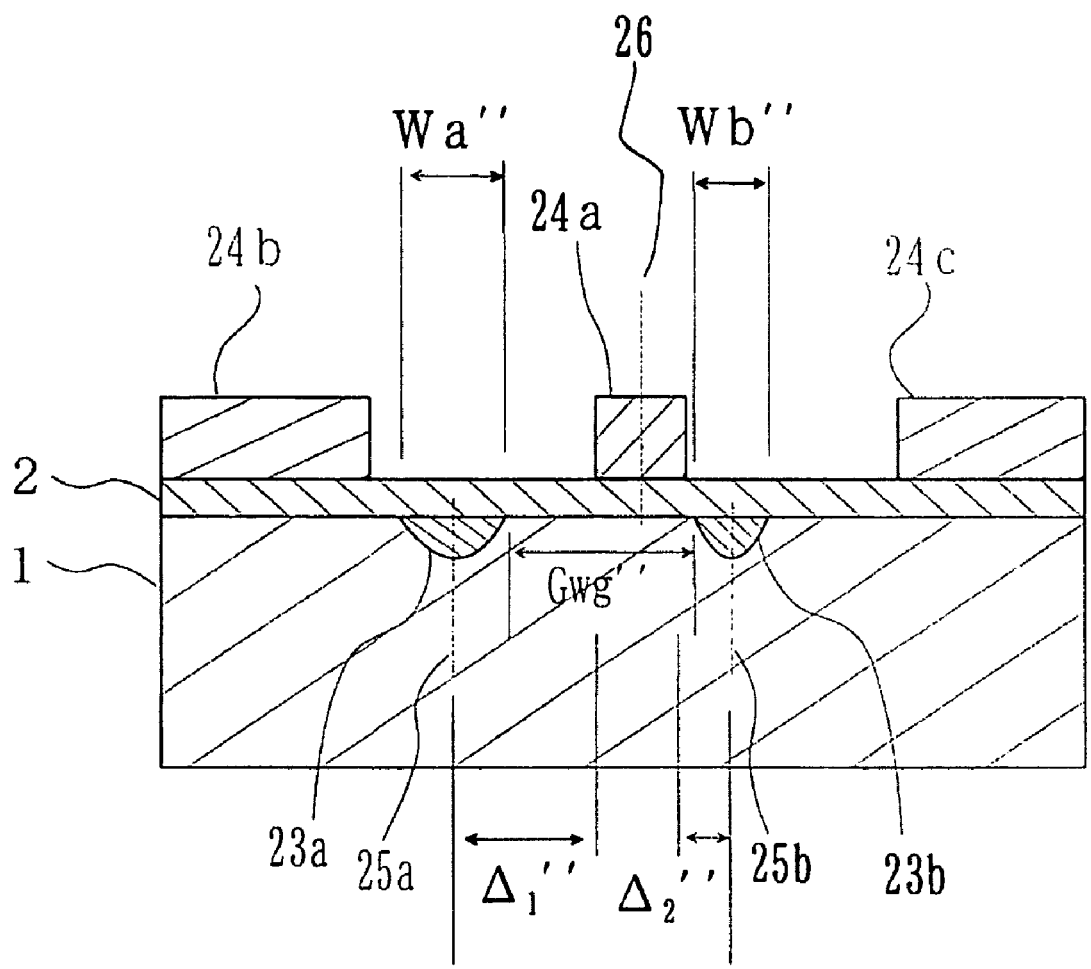
FIG. 10 is a sectional view taken along the line E-E' of FIG. 8 showing the optical modulator according to the fourth embodiment of the present invention.

FIGS. 9 and 10 are sectional views respectively taken along the line D-D' and E-E' of FIG. 8 showing the optical modulator. Here, FIGS. 9 and 10 are sectional views respectively taken along the line D-D' and E-E' of FIG. 8, shown with the center electrode 24a and the ground electrodes 24b, 24c of the traveling wave electrode 24, the x-cut LN substrate 1, and the buffer layer 2. Center (center line) 26 of the center electrode 24a in the width direction and centers (center lines) 25a and 25b of the respective interaction optical waveguides 23a and 23b in the width direction are also shown in FIGS. 9 and 10.

The legend $\Delta_1"$ represents the distance in the horizontal direction between one edge of the center electrode 24a and the center 25a of the interaction optical waveguide 23a. The legend $\Delta_2"$ represents the distance in the horizontal direction between another edge of the center electrode 24a and the center 25b of the interaction optical waveguide 23b.

The positions of the center 26 of the center electrode 24a in FIG. 9 and in FIG. 10 are away from each other in a direction parallel to the surface of the x-cut LN substrate 1. The amount of shift is, however, small enough to have an order of micron or sub-micron. Therefore, deterioration of the electrical characteristic can be prevented in the case that the first region and the second region are separated with each other with a predetermined length (for example 50 μm) to ensure that the center electrode 24a and the ground electrodes 24b and 24c at the first region can be connected linearly or gently with those of the second region, respectively.

As shown in FIG. 8, the widths Wa" and Wb" of the interaction optical waveguides 23a and 23b at the first region having a length of L1" have a relationship of Wa"<Wb" in the fourth embodiment. The optical modulator is, therefore, constructed to have a relationship of $\Delta_1"<\Delta_2"$ as shown in FIG. 9 to ensure that the interaction efficiencies (aforementioned Γ1" and Γ2") between the high frequency electric signals and the incident lights passing through the interaction optical waveguides 23a and 23b become equal with each other, which is in a similar manner with the first embodiment shown in FIG. 1.

On the other hand, the widths Wa" and Wb" have a relationship of Wa">Wb" at the second region having a length of L2". Therefore, the optical modulator is constructed to have a relationship of $\Delta_1">\Delta_2"$ to ensure that the interaction efficiencies (Γ1" and Γ2") between the high frequency electric signals and the incident lights passing through the interaction optical waveguides 23a and 23b become equal with each other.

The middle point of the gap defined by the interaction optical waveguides 23a, 23b may be positioned away from the center 18 of the center electrode 24a, or may be overlapped with the center 18 of the center electrode 24a, in a similar manner with the first embodiment and the second embodiment.

In this invention, the optical modulator is characterized in that the positional relationship between the interaction optical waveguides 23a, 23b and the traveling wave electrode 24 is shifted from the symmetry position, the traveling wave electrode 24 being constituted by a center electrode 24a and ground electrodes 24b, 24c.

As described in the second embodiment, the distance $\Delta_1$" between one edge of the center electrode 24a and the center 25a of the interaction optical waveguide 23a and the distance $\Delta_2$" between another edge of the center electrode 24a and the center 25b of the interaction optical waveguide 23b have a relationship of $\Delta_1$"$\neq\Delta_2$" in this fourth embodiment. However, the distance $\Delta_1$" and $\Delta_2$" may have a relationship of $\Delta_1$"=$\Delta_2$" under the condition that the interaction optical waveguides 23a and 23b have a certain widths or formed under a certain condition, while the middle point of the gap defined by the interaction optical waveguides 23a, 23b is positioned away from the center 26 of the center electrode 24a.

In this invention, the interaction efficiencies between the high frequency electric signals and the incident lights respectively passing through the interaction optical waveguides 23a and 23b become equal with each other. This means that there is a relationship $\Gamma1$"=$\Gamma2$" at each of the first and the second regions, where the interaction efficiency at the interaction optical waveguide 23a is represented by the legend $\Gamma1$" and the interaction efficiency at the interaction optical waveguide 23b is represented by the legend $\Gamma2$". Therefore, the length L1" of the first region and the length L2" of the second region can be set without any restriction due to the fact that it is unnecessary to consider the amount of phase variation between the first region and the second region caused by the propagation loss of the electrode. This results in the fact that it is possible to set the length L1" of the first region and the length L2" of the second region to be equal with each other (L1"=L2").

In general, effective refractive index of optical waveguide having large width is higher than that of the optical waveguide having small width. Therefore, the fact that the length L1" of the first region and the length L2" of the second region are equal with each other (L1"=L2") results in the fact that the optical path lengths of the interaction optical waveguides 23a and 23b forming the Mach-Zehnder interferometer are equal with each other. This results in the fact that the DC bias voltage is not necessary to be changed against the optical wavelengths due to the fact that the optical modulator can suppress filter characteristics against the optical wavelength. The optical modulator is, therefore, advantageous to be used with the optical communication methods using a wide band of optical wavelength such as WDM (Wavelength Division Multiplexing) and DWDM (Dense Wavelength Division Multiplexing).

Fifth Embodiment

Figure 11:
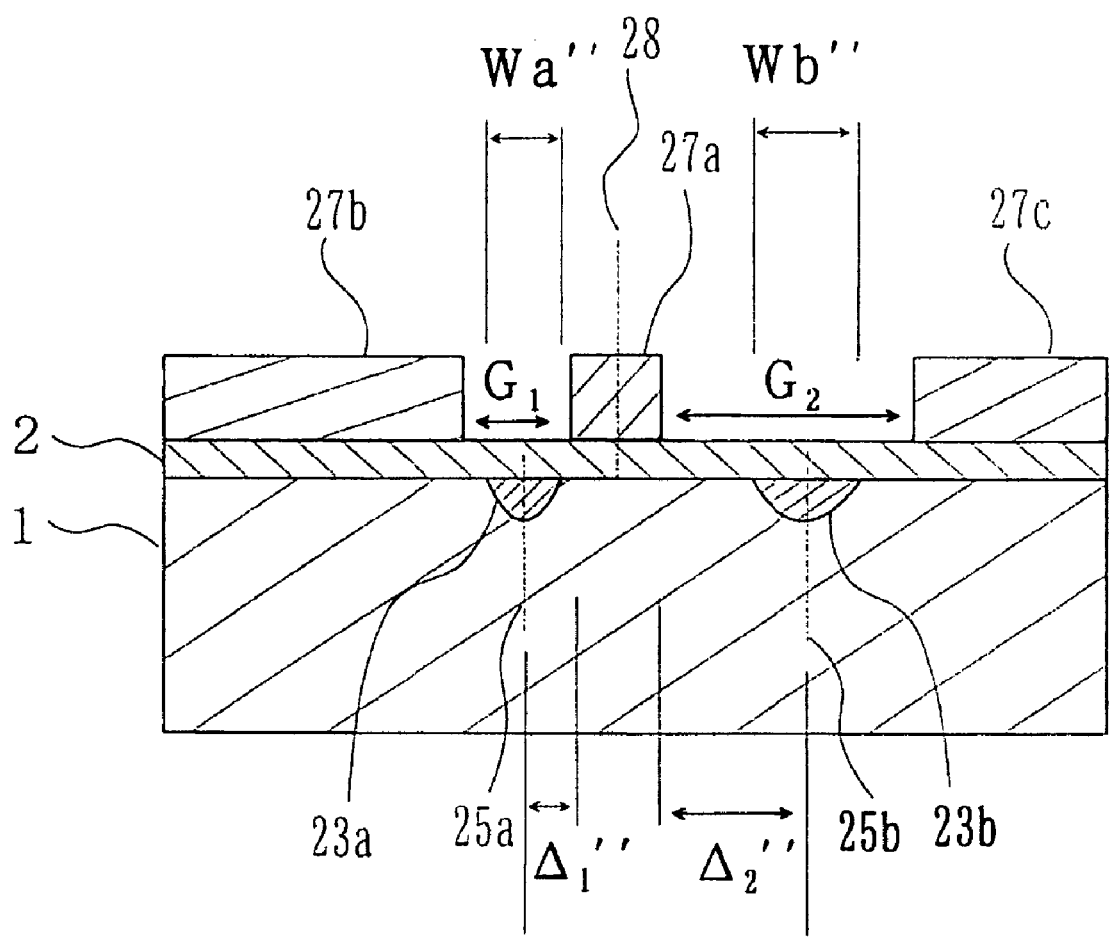
FIG. 11 is a sectional view taken along the line D-D' of FIG. 8 showing the optical modulator according to the fifth embodiment of the present invention.
Figure 12:
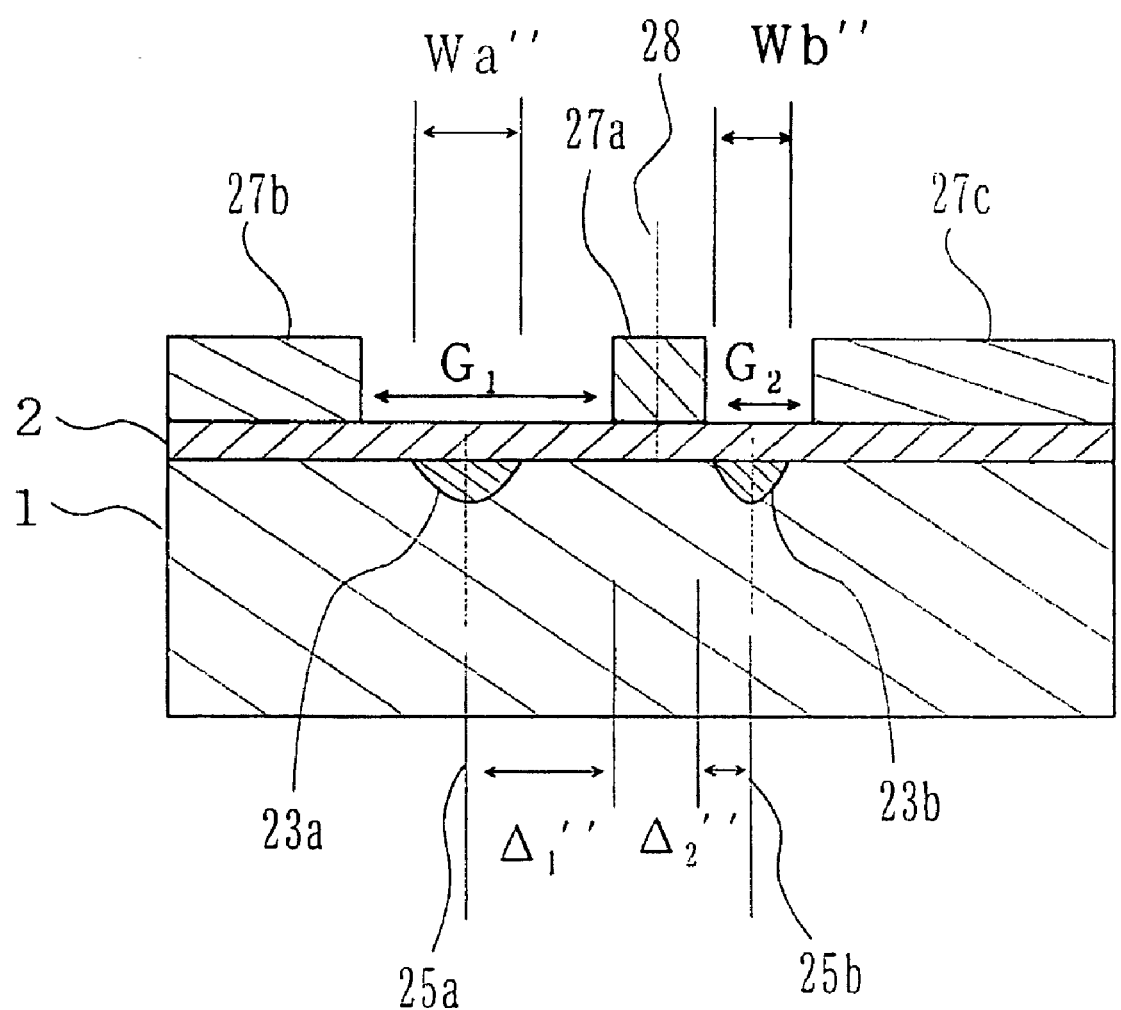
FIG. 12 is a sectional view taken along the line E-E' of FIG. 8 showing the optical modulator according to the fifth embodiment of the present invention.
Figure 13:
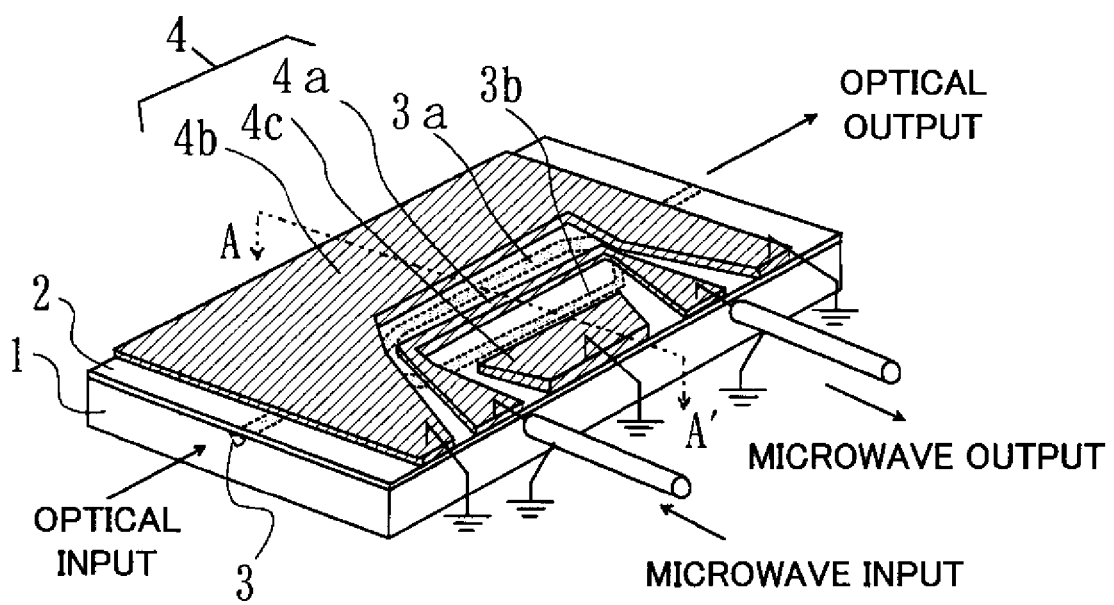
FIG. 13 is a perspective view showing the optical modulator according to the first prior art.
Figure 14:
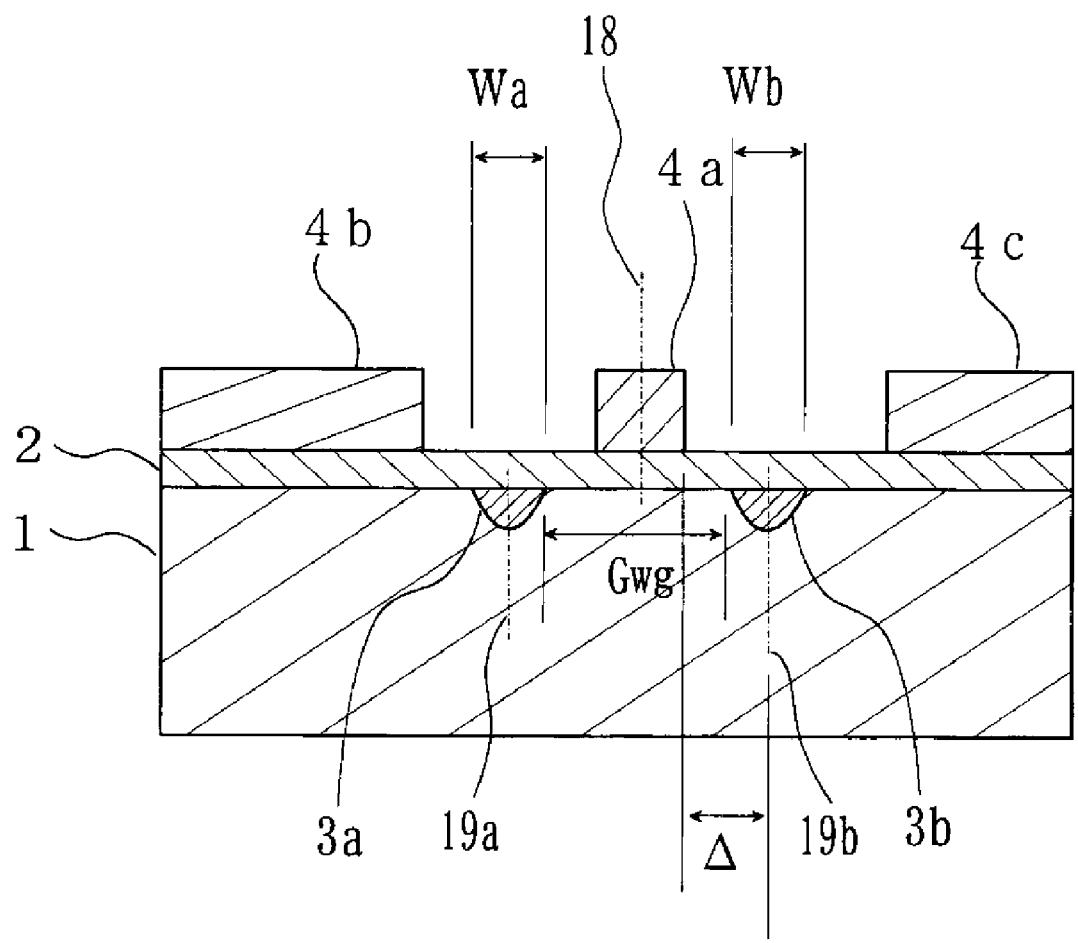
FIG. 14 is a sectional view taken along the line A-A' of FIG. 13 showing the optical modulator according to the first prior art.
Figure 15:
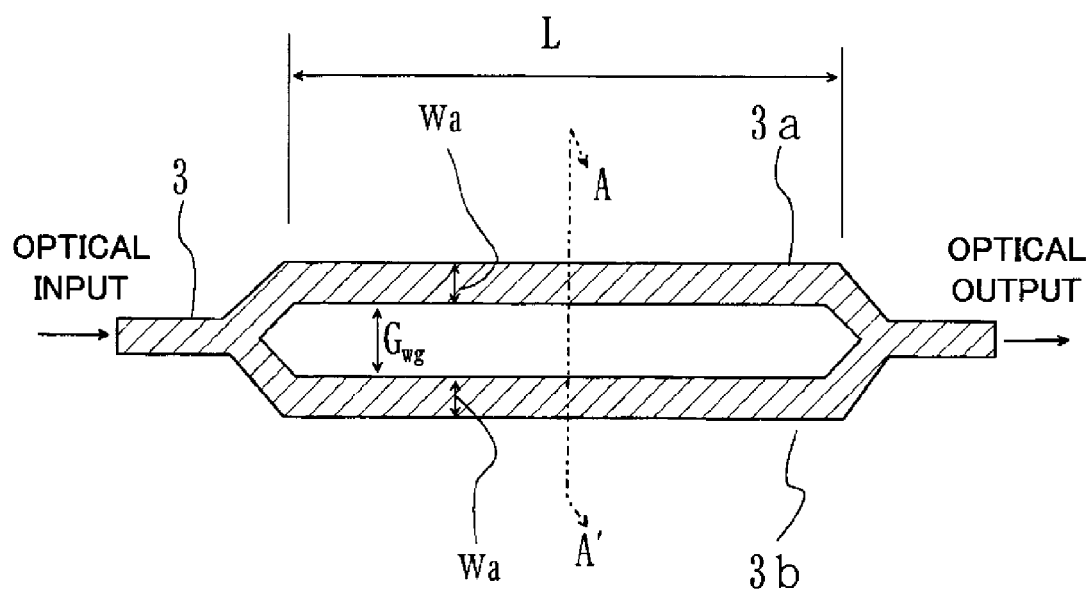
FIG. 15 is a top view showing the optical waveguide according to the first prior art.
Figure 16:
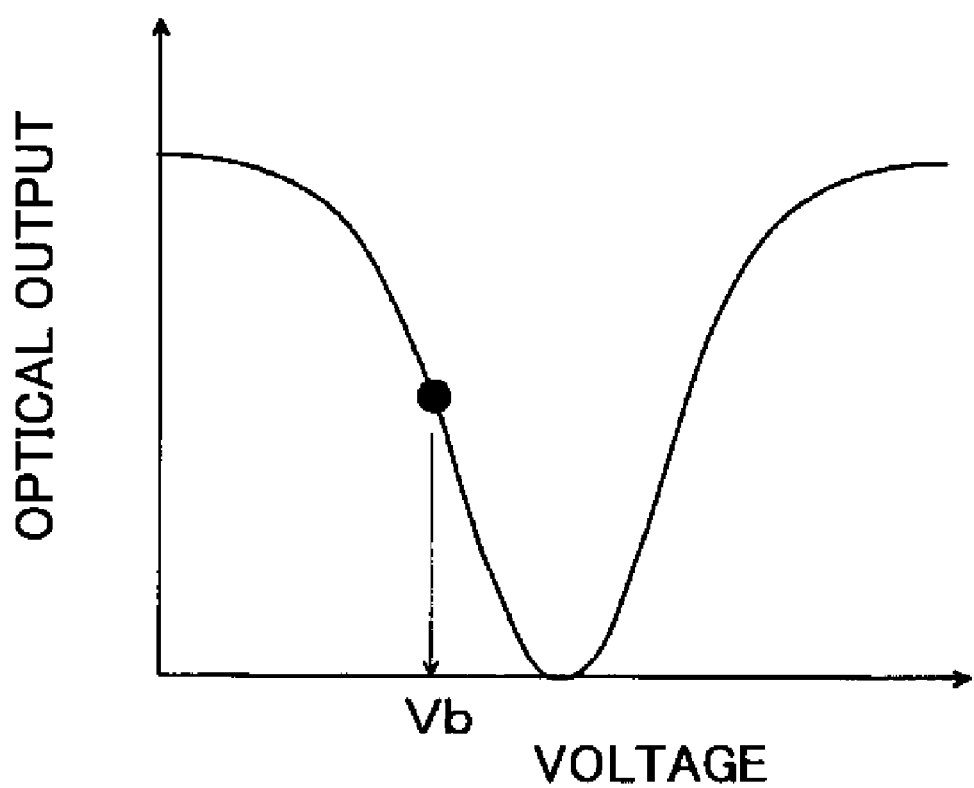
FIG. 16 is a graph to explain the operation of the optical modulator according to the first prior art.
Figure 17:
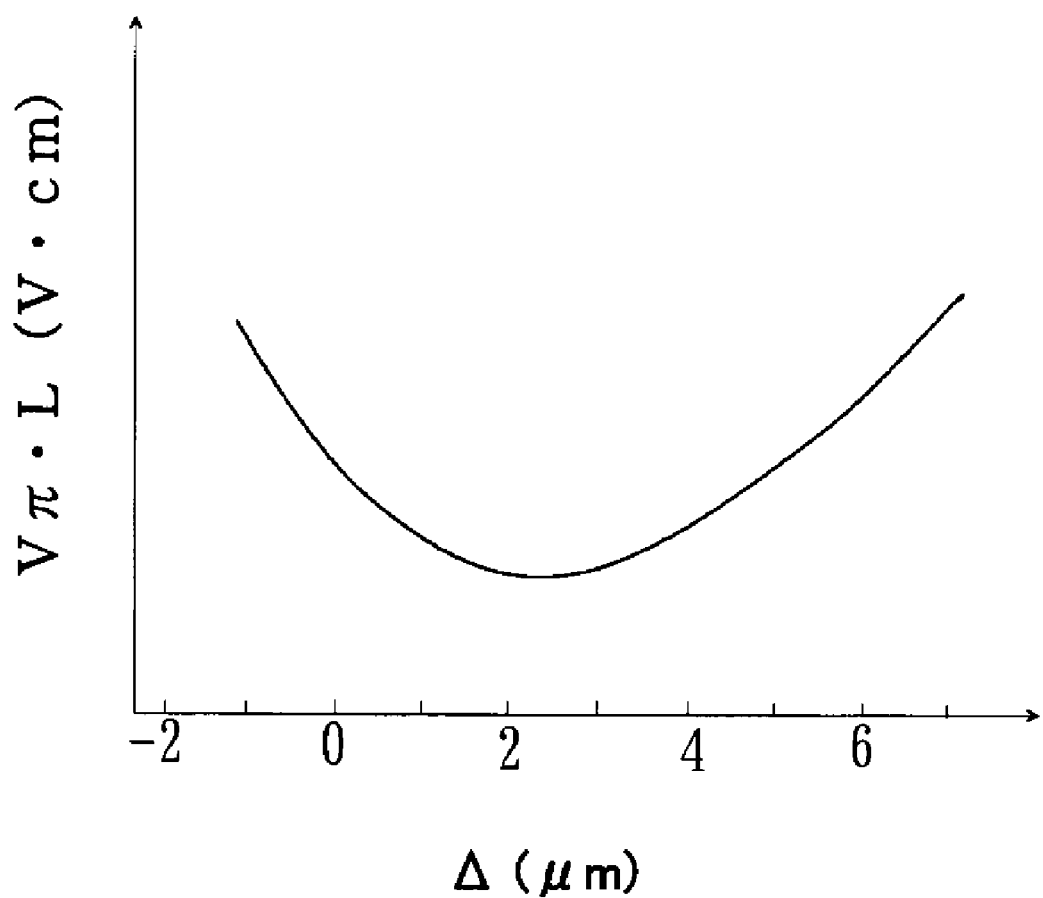
FIG. 17 is a graph showing the relationship between V$\pi$·L and $\Delta$.
Figure 18:
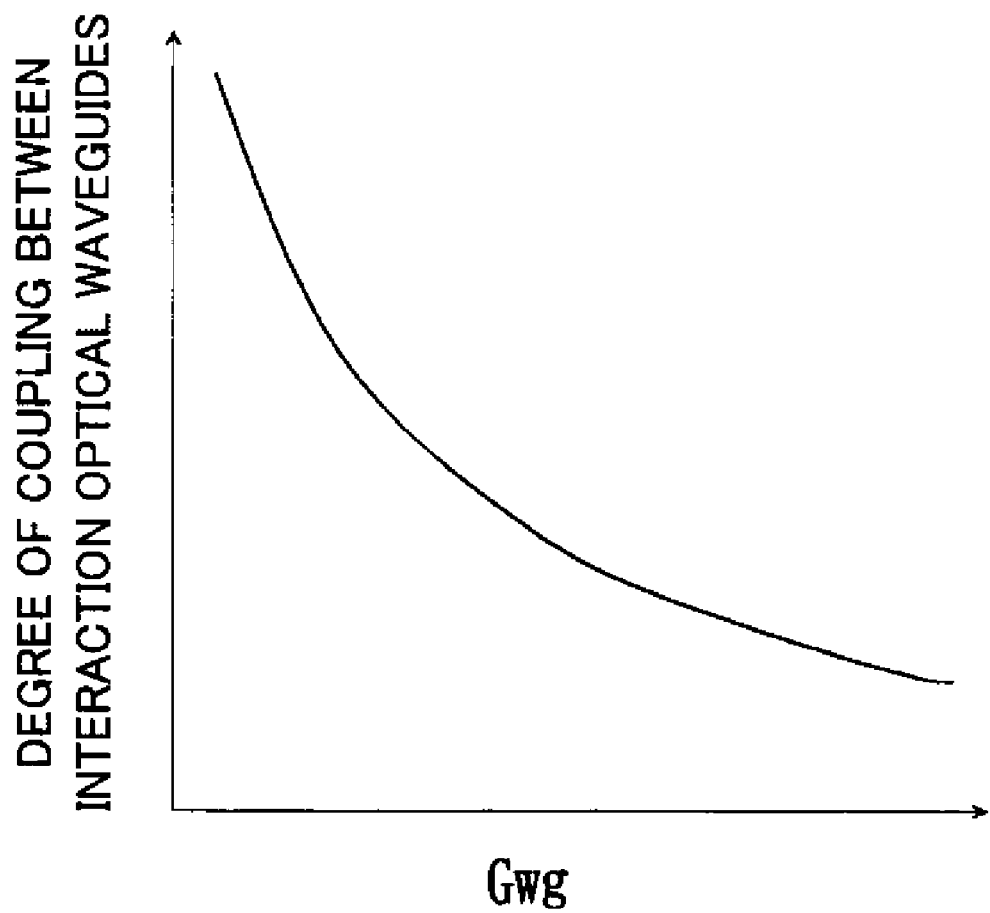
FIG. 18 is a graph showing the relationship between the degree of coupling and $G_{wg}$.
Figure 19:
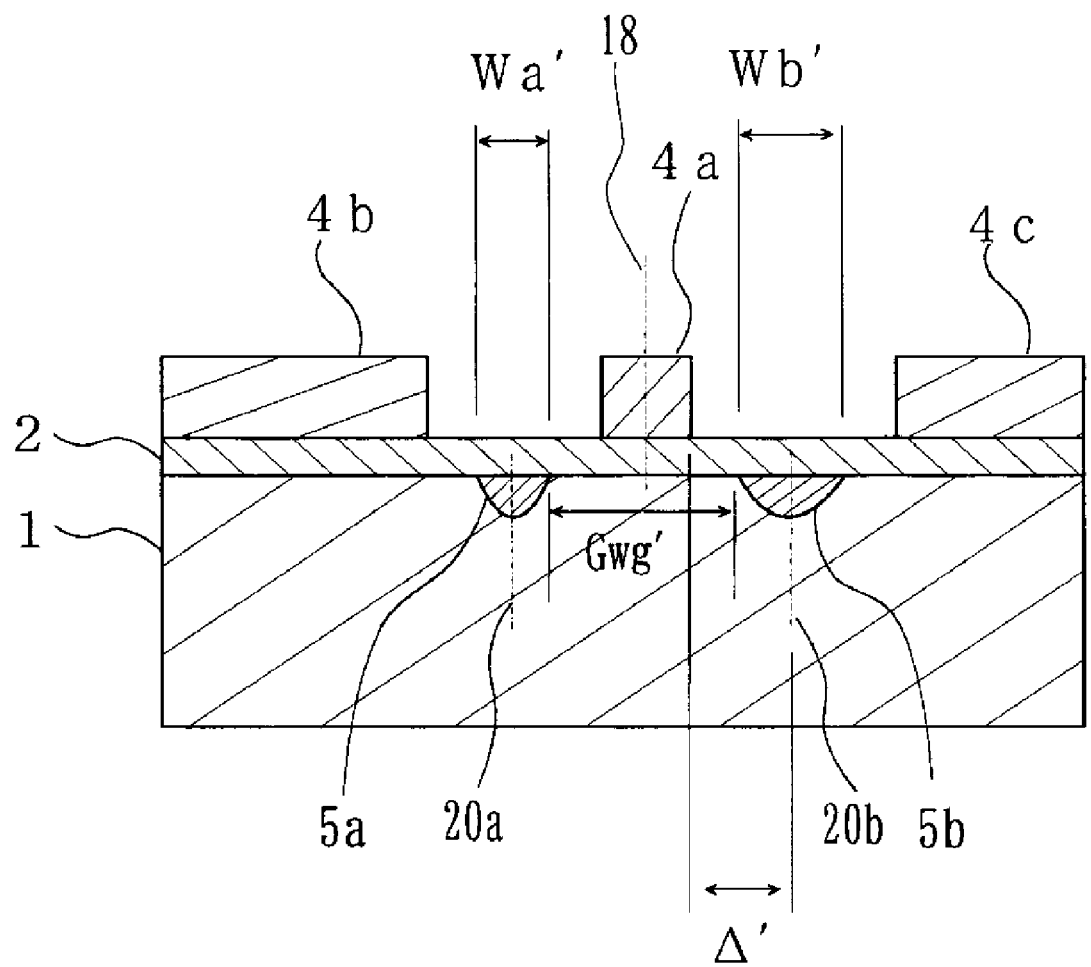
FIG. 19 is a sectional view showing the optical modulator according to the second prior art.
Figure 20:
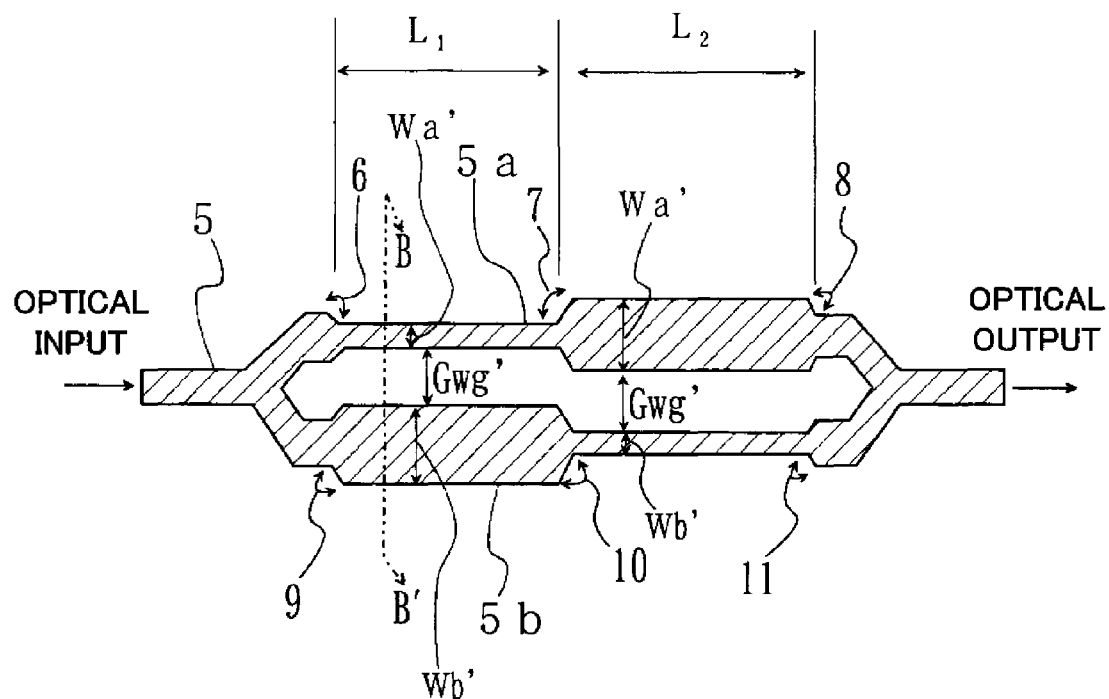
FIG. 20 is a top view showing the optical waveguide according to the second prior art.

The interaction optical waveguides 23a and 23b according to the fourth embodiment of the present invention shown in FIG. 8 may be formed with a CPW traveling wave electrode 17 having gaps respectively have sizes different from each other, in a similar manner with the third embodiment, this constitution being disclosed as a fifth embodiment. FIGS. 11 and 12 are sectional views respectively taken along the line D-D' and E-E' of FIG. 8 showing the optical modulator.

FIGS. 11 and 12 additionally show a center (a center line) 28 of the center electrode 27a partly forming the CPW traveling wave electrode. The legend $\Delta_1$" represents the distance in the horizontal direction between one edge of the center electrode 27a and the center 25a of the interaction optical waveguide 23a. The legend $\Delta_2$" represents the distance in the horizontal direction between another edge of the center electrode 27a and the center 25b of the interaction optical waveguide 23b.

As shown in FIGS. 11 and 12, the magnitude relationship between the gaps G1 and G2 formed by the center electrode 27a and ground electrodes 27b, 27c of the CPW traveling wave electrode 27 at the first region having a length of L1" is reciprocal to the magnitude relationship at the second region having a length of L2". (G1<G2 and $\Delta_1$"<$\Delta_2$" at the first region shown in FIG. 11. G1>G2 and $\Delta_1$">$\Delta_2$" at the second region shown in FIG. 12.) In this embodiment, it is important to have a relationship of G1≠G2. Therefore, $\Delta_1$" and $\Delta_2$" may have aforementioned relationship as an example, but not limited thereto. The middle point of the gap defined by the interaction optical waveguides 23a, 23b may be positioned away from the center 28 of the center electrode 27a, or may be overlapped with the center 28 of the center electrode 27a.

In this embodiment, the length L1" of the first region and the length L2" of the second region can be set without any restriction due to the fact that the interaction efficiencies between the high frequency electric signals and the incident lights passing through the respective interaction optical waveguides 23a and 23b become equal with each other at each of the first region and the second region. This constitution makes it possible to suppress filter characteristics against the optical wavelength under the condition that the lengths L1" and L2" are set to be L1"=L2", in a similar manner with the fourth embodiment of this invention.

There may be three or more regions in the case that the optical modulator has a region to ensure that the magnitude relationship between the interaction optical waveguides 23a and 23b are interchanged, in a similar manner with the fourth and fifth embodiments of this invention. In this case, the filter characteristics can be suppressed by making the length where the interaction optical waveguide is narrow and the length where the interaction optical waveguide is wide to be equal to each other.

While particular embodiments have been described, it will be appreciated by those in the art that changes and modifications may be made thereto without departing from the invention in its broader aspects.

Each Embodiment

There has been described about the fact that the traveling wave electrode is constituted by the CPW electrode, the traveling wave electrode may be constituted by any types of traveling wave electrode, or may be replaced by a lumped parameter electrode.

It is within the scope of this invention that the optical modulator has a portion where the magnitude relationship between the interaction optical waveguides 12a and 12b becomes reciprocal as long as the relationship of the lengths between the portion and other portion is different from the relationship described by the formula (7), resulting from the fact that the method described in the second prior art is not utilized.

There has been described about the fact that the two interaction optical waveguides are formed to have widths different from each other from the aspect of spot-size. However, the fact that the widths of the two interaction optical waveguides are varied with each other is tantamount to the fact that the effective refractive indexes are varied with each other. This leads to the fact that the difference of the effective refractive indexes can be large by leaving a buffer layer formed by the $SiO_2$ or $SiO_x$ over the interaction optical waveguide having higher effective refractive index while removing the buffer layer over the interaction optical waveguide having lower effective refractive index. This results in the two interaction optical waveguides difficult to be coupled with each other. This constitution can be easily applied to any embodiments of this invention.

Furthermore, in each embodiment, the LN substrate may have an x-cut state, a y-cut state, or a z-cut state. In other words, the LN substrate may have a surface direction such that x-axis, y-axis, or z-axis of the crystal is perpendicular to the surface (cut surface) of the LN substrate. The LN substrate may be formed such that the main surface direction, the direction as described above, is mixed with a sub surface direction different from the main surface direction. The LN substrate may be formed with another material having the electro-optic effect such as lithium tantalite and a semiconductor.

Industrial Applicability of the Present Invention

In accordance with the present invention, there is provided an optical modulator which is available for an optical modulator with high modulation speed, low alpha parameter, high extinction ratio, low drive voltage, and low DC bias voltage.

What is claimed is:

1. An optical modulator, comprising:
a substrate having an electro-optic effect;
an optical waveguide embedded in said substrate to have a light wave guided therein; and
a traveling wave electrode mounted on said substrate to have a high frequency electric signal applied thereon so that said light wave is modulated by said high frequency electric signal with said electro-optic effect, said traveling wave electrode being constituted by a center electrode and ground electrodes; in which:
said optical waveguide has first and second interaction optical waveguides to collectively form a Mach-Zehnder optical waveguide operative to modulate said light wave in a phase modulation manner under the condition that said high frequency electric signal is applied to said traveling wave electrode, and an optical input portion to have said light wave inputted therethrough,
said first and second interaction optical waveguides collectively form a region where respective widths of said first and second interaction optical waveguides are different from each other,
said first and second interaction optical waveguides are formed such that one of said first and second interaction optical waveguides has a spot-size larger than a spot-size of said light wave guided in the other of said first and second interaction optical waveguides,
said first and second interaction optical waveguides are positioned such that a distance between said center electrode and a center of one of said first and second interaction optical waveguides having a larger spot-size is closer than a distance between said center electrode and a center of the other of said first and second interaction optical waveguides, to ensure that interaction efficiencies between said high frequency electric signal and said light wave guided in said respective first and second interaction optical waveguides are substantially equal to each other, and
said first and second interaction optical waveguides are formed to respectively have widths different from said optical input portion such that one of said first and second interaction optical waveguides has a width narrower than said optical input portion while the other of said first and second interaction optical waveguides has a width wider than said optical input portion, and said first and second interaction optical waveguides are also formed to have taper portions to be connected with said optical input portion, respectively.

2. An optical modulator as set forth in claim 1, in which:
one of said ground electrodes is positioned with said center electrode across said first interaction optical waveguide, one of said ground electrodes and said center electrode forming a first gap therebetween, and
the other of said ground electrodes is positioned with said center electrode across said second interaction optical waveguide, the other of said ground electrodes and said center electrode forming a second gap therebetween, and said second gap being wider than said first gap.

3. An optical modulator as set forth in claim 1, in which said respective widths of said first and second interaction optical waveguides are unchanged at said region.

4. An optical modulator as set forth in claim 1, in which said first and second interaction optical waveguides form an additional region such that said respective widths of said first and second interaction optical waveguides at said region are different from said respective widths of said first and second interaction optical waveguides at said additional region.

5. An optical modulator as set forth in claim 4, in which said widths of said first and second interaction optical waveguides at said region and said widths of said first and second interaction optical waveguides at said additional region are reciprocal, and
said region and said additional region have longitudinal lengths equal to each other.

* * * * *